(12) United States Patent
Leonard et al.

(10) Patent No.: US 10,642,610 B2
(45) Date of Patent: *May 5, 2020

(54) SCALABLE CLOUD-BASED TIME SERIES ANALYSIS

(71) Applicant: SAS Institute Inc., Cary, NC (US)

(72) Inventors: Michael James Leonard, Cary, NC (US); Thiago Santos Quirino, Morrisville, NC (US); Edward Tilden Blair, Cary, NC (US); Jennifer Leigh Sloan Beeman, Cary, NC (US); David Bruce Elsheimer, Clayton, NC (US); Javier Delgado, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/697,680

(22) Filed: Nov. 27, 2019

(65) Prior Publication Data

US 2020/0110602 A1   Apr. 9, 2020

Related U.S. Application Data

(63) Continuation of application No. 16/419,680, filed on May 22, 2019, now Pat. No. 10,503,498, which is a (Continued)

(51) Int. Cl.
*G06F 8/76* (2018.01)
*G06F 16/23* (2019.01)
(Continued)

(52) U.S. Cl.
CPC ............... *G06F 8/76* (2013.01); *G06F 8/60* (2013.01); *G06F 9/5072* (2013.01); *G06F 16/2322* (2019.01)

(58) Field of Classification Search
CPC .......... G06F 8/76; G06F 16/2322; G06F 8/60; G06F 9/5072
See application file for complete search history.

(56) References Cited

U.S. PATENT DOCUMENTS 8,108,243 B2 * 1/2012 Solotorevsky ......... G06Q 10/04
                                                              705/7.29
8,374,903 B2 * 2/2013 Little ................. G06Q 30/0202
                                                              705/7.31
(Continued)

*Primary Examiner* — Benjamin C Wu
(74) *Attorney, Agent, or Firm* — The Law Office of Tiffany E. Monroe, LLC; Tiffany E. Monroe

(57) ABSTRACT

In some examples, computing devices can partition timestamped data into groups. The computing devices can then distribute the timestamped data based on the groups. The computing devices can also obtain copies of a script configured to process the timestamped data, such that each computing device receives a copy of the script. The computing devices can determine one or more code segments associated with the groups based on content of the script. The one or more code segments can be in one or more programming languages that are different than a programming language of the script. The computing devices can then run the copies of the script to process the timestamped data within the groups. This may involve interacting with one or more job servers configured to run the one or more code segments associated with the groups.

30 Claims, 26 Drawing Sheets

Related U.S. Application Data continuation-in-part of application No. 16/193,661, filed on Nov. 16, 2018, now Pat. No. 10,331,490.

(60) Provisional application No. 62/828,136, filed on Apr. 2, 2019, provisional application No. 62/768,494, filed on Nov. 16, 2018, provisional application No. 62/749,254, filed on Oct. 23, 2018, provisional application No. 62/652,078, filed on Apr. 3, 2018, provisional application No. 62/594,406, filed on Dec. 4, 2017, provisional application No. 62/587,281, filed on Nov. 16, 2017.

(51) Int. Cl.
*G06F 9/50* (2006.01)
*G06F 8/60* (2018.01)

(56) References Cited

U.S. PATENT DOCUMENTS

| | | | |
|---|---|---|---|
| 9,940,169 B2* | 4/2018 | Moudy | G06F 9/5027 |
| 2015/0052173 A1* | 2/2015 | Leonard | G06F 16/211 |
| | | | 707/792 |
| 2015/0255983 A1* | 9/2015 | Sum | H04L 69/28 |
| | | | 709/224 |
| 2017/0083579 A1* | 3/2017 | Du | G06F 16/182 |
| 2018/0069925 A1* | 3/2018 | Lavasani | H04L 47/12 |

* cited by examiner

```
PROC TSMODEL DATA=sascas1.air OUTARRAY=sascas1.outarray
OUTSCALAR=sascas1.outscalar OUTOBJ=(log=sascas1.extlog);
ID date INTERVAL=MONTH;
VAR air;
OUTSCALAR runtime;
OUTARRAY pyair;
REQUIRE extlang;
SUBMIT;
   do i=1 to _LENGTH_;
      pyair[i] = air[i];
   end;

/* Run the Python interpreter */
   declare object py(PYTHON2);
   rc = py.Initialize();
   rc = py.PushCodeLine('air *= 10');
   rc = py.AddVariable(pyair,'ALIAS','air','READONLY','FALSE');
   rc = py.Run();
   runtime = py.GetRuntime();

declare object log(OUTEXTLOG);
   rc = log.Collect(py,'ALL');
ENDSUBMIT;
RUN;
```

2210a
2210b
2210c
2210d
2208

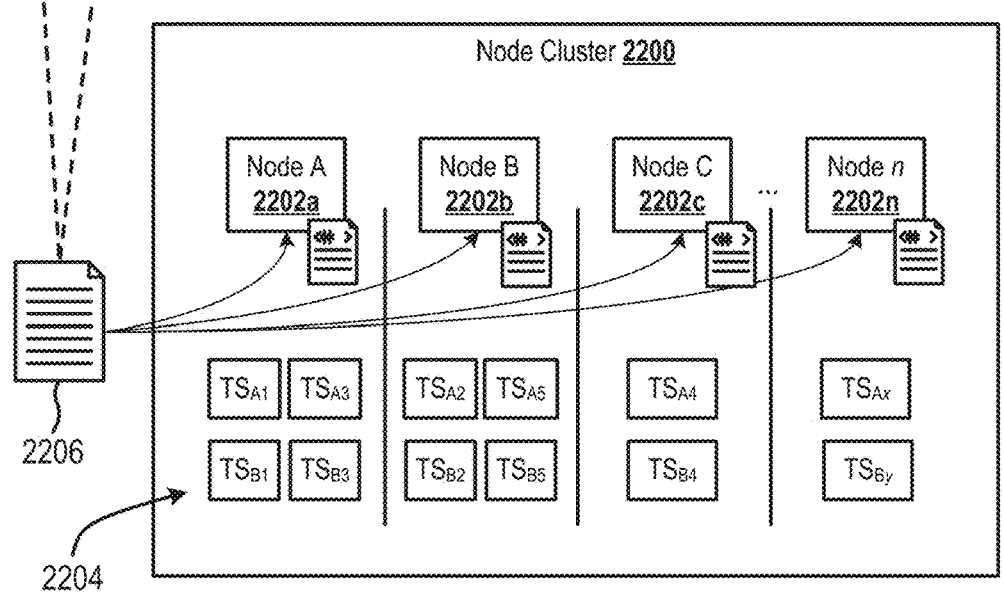

FIG. 22

SCALABLE CLOUD-BASED TIME SERIES ANALYSIS

CROSS REFERENCE TO RELATED APPLICATIONS

This application is a continuation of, and claims the benefit of priority under 35 USC § 120 to U.S. patent application Ser. No. 16/419,680 (U.S. Pat. No. 10,503,498) filed on May 22, 2019, which claims the benefit of priority under 35 U.S.C. § 119(e) to U.S. Provisional Patent Application No. 62/828,136 filed on Apr. 2, 2019, and under 35 U.S.C. § 120 as a continuation-in-part of U.S. patent application Ser. No. 16/193,661 (U.S. Pat. No. 10,331,490), titled "Scalable Cloud-Based Time Series Analysis" and filed on Nov. 16, 2018, which claims the benefit of priority under 35 U.S.C. § 119(e) to U.S. Provisional Patent Application No. 62/768,494 filed on Nov. 16, 2018, to U.S. Provisional Patent Application No. 62/749,254 filed on Oct. 23, 2018, to U.S. Provisional Patent Application No. 62/652,078 filed on Apr. 3, 2018, to U.S. Provisional Patent Application No. 62/594,406 filed on Dec. 4, 2017, and to U.S. Provisional Patent Application No. 62/587,281 filed on Nov. 16, 2017, the entirety of each of which is hereby incorporated by reference herein.

TECHNICAL FIELD

The present disclosure relates to grid computing generally and more specifically to parallelized distribution and analysis of time series data.

BACKGROUND

Timestamped data can provide important and useful information to organizations. Organizations can leverage timestamped data to obtain information needed to better serve their customers, to reduce waste, and to otherwise benefit the organization or other entities. Timestamped data can be modeled, forecast, mined, or otherwise processed to inform (interactive or automated) decision making.

In another example, manufacturers can leverage timestamped data relating to critical equipment to make decisions about maintenance scheduling to avoid critical component failures. In another example, railroad companies can leverage timestamped data of shipments between various regions around the country to make decisions about where to stock rail cars to better meet predicted demand and minimize shipping delays. In another example, energy companies can monitor and analyze timestamped data in real-time related to performance of wind turbines to quickly detect and respond to critical anomalous behavior and to maintain high turbine performance over time. In another example, hospitals can aggregate timestamped medical patient data across various departments to better predict patient outcome and quickly detect and respond to potential healthcare issues.

As technologies continue to be developed that make capturing and collecting timestamped data easier than ever before, the sheer volume of timestamped data available to an organization can grow to be extremely large (e.g., hundreds of gigabytes to hundreds of terabytes and more). For example, the proliferation of internet of things (TOT) devices capable of user interaction and/or data sensing is generating a deluge of timestamped data that may be very useful to many organizations if it can be leveraged.

As the sizes of these databases of timestamped data increase, computational, architectural, and analytical challenges exist that can make it impractical or impossible for organizations to store and/or process these databases using conventional techniques. The database and computational expenses necessary to store and/or process the data can become infeasible for some organizations. In some cases, the sheer amount of memory necessary for processing such large amounts of data can quickly overwhelm an organization's hardware and communication resources. Further, timestamped data itself can be especially difficult to store and process in situations when the data must be sorted (by time) prior to analysis. Time series analysis requires time-ordered sequences of data. In some cases, simply moving timestamped data between various devices during analysis can become very computationally and communicatively expensive. As a result, it may be computationally infeasible for organizations to leverage all available timestamped data when making important decisions, which may result in less accurate predictions and missed opportunities in various fields. In the aforementioned examples, such missed opportunities could include not detecting an upcoming need for maintenance resulting in a critical hardware part failure in a predictive maintenance situation, not identifying an upcoming need for rail cars in a region resulting in undesired shipping delays in an industrial transportation situation, and not detecting a potential health issue for a hospital patient that would otherwise have been detected in a medical situation. Such missed opportunities may have been avoided had the organization been able to leverage more of this type of data in a computationally and communicatively efficient manner.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

One example of the present disclosure includes a system comprising one or more data processors associated with a plurality of computing devices. The system also comprises a non-transitory computer-readable storage medium comprising instructions that are executable by the one or more data processors for causing the plurality of computing devices to perform operations. The operations can include reading timestamped data and partition the timestamped data into a plurality of groups according to a criterion. The operations can include distributing the timestamped data among the plurality of computing devices based on the plurality of groups. The operations can include obtaining copies of a script configured to process the timestamped data, each computing device among the plurality of computing devices receiving a copy of the script. The operations can include determining one or more code segments associated with the plurality of groups based on content of the script, the one or more code segments being in one or more programming languages that are different than a programming language of the script. The operations can include running the copies of the script to process the timestamped data within the plurality of groups, each copy of the script being run on the timestamped data in a respective group among the plurality of groups at least in part by interacting with a job server configured to run a respective code segment associated with the respective group. The job server can be compatible with a particular programming language of the respective code segment and being configured to run the respective code segment to generate respective model values associated with the respective group by: generating header code in the particular programming language, the header code defining one or more global variables having values provided in the script; generating footer code in the particular programming language, the footer code defining one or more output routines for returning the respective model values associated with the respective group; generating a modified code segment by combining the header code and the footer code with the respective code segment; and running the modified code segment based on the timestamped data in the respective group, thereby generating and returning the respective model values associated with the respective group.

Another example of the present disclosure includes a method comprising reading, by a plurality of computing devices, timestamped data and partition the timestamped data into a plurality of groups according to a criterion. The method can include distributing, by the plurality of computing devices, the timestamped data among the plurality of computing devices based on the plurality of groups. The method can include obtaining, by the plurality of computing devices, copies of a script configured to process the timestamped data, each computing device among the plurality of computing devices receiving a copy of the script. The method can include determining, by the plurality of computing devices, one or more code segments associated with the plurality of groups based on content of the script, the one or more code segments being in one or more programming languages that are different than a programming language of the script. The method can include running, by the plurality of computing devices, the copies of the script to process the timestamped data within the plurality of groups, each copy of the script being run on the timestamped data in a respective group among the plurality of groups at least in part by interacting with a job server configured to run a respective code segment associated with the respective group. The job server can be compatible with a particular programming language of the respective code segment and being configured to run the respective code segment to generate respective model values associated with the respective group by: generating header code in the particular programming language, the header code defining one or more global variables having values provided in the script; generating footer code in the particular programming language, the footer code defining one or more output routines for returning the respective model values associated with the respective group; generating a modified code segment by combining the header code and the footer code with the respective code segment; and running the modified code segment based on the timestamped data in the respective group, thereby generating and returning the respective model values associated with the respective group.

Still another example of the present disclosure includes a non-transitory computer-readable storage medium comprising program code that is executable by one or more data processors associated with a plurality of computing devices for causing the plurality of computing devices to perform operations. The operations can include reading timestamped data and partition the timestamped data into a plurality of groups according to a criterion. The operations can include distributing the timestamped data among the plurality of computing devices based on the plurality of groups. The operations can include obtaining copies of a script configured to process the timestamped data, each computing device among the plurality of computing devices receiving a copy of the script. The operations can include determining one or more code segments associated with the plurality of groups based on content of the script, the one or more code segments being in one or more programming languages that are different than a programming language of the script. The operations can include running the copies of the script to process the timestamped data within the plurality of groups, each copy of the script being run on the timestamped data in a respective group among the plurality of groups at least in part by interacting with a job server configured to run a respective code segment associated with the respective group. The job server can be compatible with a particular programming language of the respective code segment and being configured to run the respective code segment to generate respective model values associated with the respective group by: generating header code in the particular programming language, the header code defining one or more global variables having values provided in the script; generating footer code in the particular programming language, the footer code defining one or more output routines for returning the respective model values associated with the respective group; generating a modified code segment by combining the header code and the footer code with the respective code segment; and running the modified code segment based on the timestamped data in the respective group, thereby generating and returning the respective model values associated with the respective group.

BRIEF DESCRIPTION OF THE DRAWINGS

The specification makes reference to the following appended figures, in which use of like reference numerals in different figures is intended to illustrate like or analogous components.

FIG. 14 is a schematic diagram depicting script sharing in a computing environment according to certain aspects of the present disclosure.

FIG. 16 is a schematic diagram depicting timestamp data in a computing environment after partitioning and distribution according to certain aspects of the present disclosure.

FIG. 22 is a block diagram of an example of script sharing among a node cluster along with script content according to some aspects.

DETAILED DESCRIPTION

Figure 1:
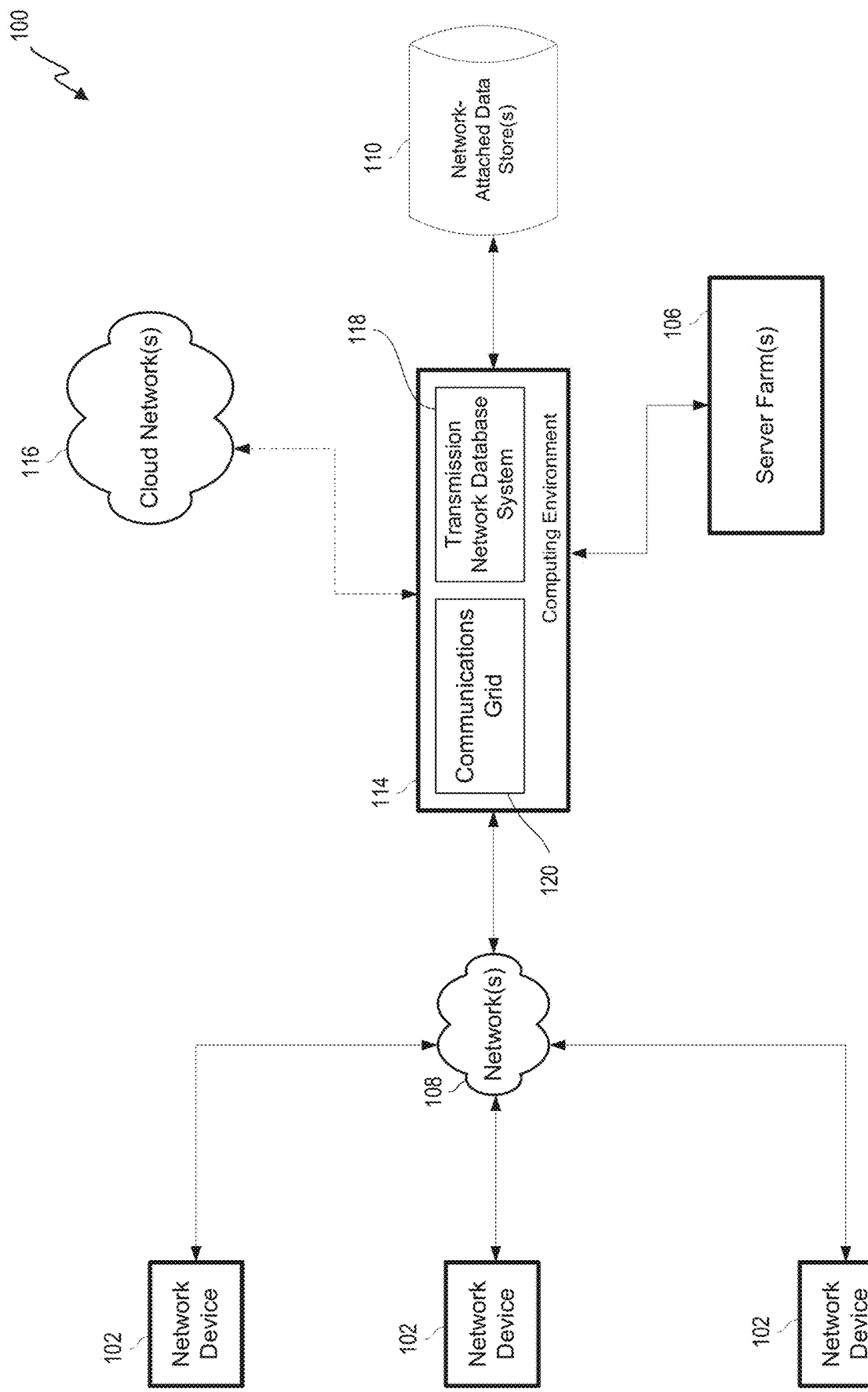
FIG. 1 illustrates a block diagram that provides an illustration of the hardware components of a computing system, according to certain aspects of the present disclosure.

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Certain aspects and features of the present disclosure relate to techniques for deterministically distributing timestamped data across multiple computing devices for analysis. Each computing device can read, in parallel, a portion of an input data set containing unsorted and ungrouped timestamped data. Based on time series criteria, the timestamped data can be partitioned into separate groups of data, each of which can be deterministically assigned to a computing device using a modulo function of the hash value of the time series criteria for that group and the total number of computing devices. The timestamped data can then be routed to the identified computing device for further processing. Each computing device can then sort and accumulate the grouped timestamped data into ordered time series. Each computing device can execute a distributed script detailing how to process the various time series, resulting in output data that can be written in parallel. As a result, vast amounts of timestamped data can be easily analyzed across an easily expandable number of computing devices with reduced computational expense.

Timestamped data is being collected at ever-increasing rates, resulting in databases that can exceed hundreds of gigabytes, hundreds of terabytes, or more. If these databases can be leveraged, they can provide invaluable information and insight across many fields. However, there are substantial challenges that accompany processing such large amounts of data. Additionally, since analysis of timestamped data generally has constraints on how the data is presented (e.g., sorted and/or accumulated), raw timestamped data, which may not be stored in any sorted or accumulated form, may need pre-processing before performing analysis thereon. Finally, the process of moving large amounts of data between devices (e.g., between a device for storing the data and a device for processing the data) is often the most expensive part of analyzing a large data set. Often, traditional processing techniques end up transmitting the same data multiple times during processing of a large dataset.

Certain aspects of the present disclosure relate to processing timestamped data in an easily scalable environment, allowing additional computing devices to be added without difficulty. This ease of scaling enabled by certain aspects of the present disclosure can permit organizations to temporarily increase computing capacity on demand. Further, the ease of scaling allows increases in computing capacity to occur only as needed, which can be dependent upon the input data (e.g., source database), the partitioning scheme of the timestamped data (e.g., criteria for separating the timestamped data into time series), the analysis to be performed on the timestamped data, or other criteria.

Certain aspects of the present disclosure enable large amounts of timestamped data to be analyzed with reduced or minimal reading passes, thus reducing the computational time used to read the data and reducing the bandwidth used to read the data. In some cases, timestamped data can be read in parallel in a single pass. As such, minimal bandwidth is used to read the input data. This reduction in bandwidth usage can provide substantial savings to both organizations seeking analysis of their data and organizations offering analysis or storage of the data as a service.

In addition to the aforementioned benefits, the ability to easily scale the environment and the reduction in bandwidth can enable certain aspects of the present disclosure to be more easily implemented in a cloud environment.

Certain aspects of the present disclosure relate to reading and distributing input data. The input data can be a collection of timestamped data. Timestamped data can be any data associated with a timestamp. In some cases, input data can include one or more tables, each table containing multiple rows of timestamped data. In some cases, each row of timestamped data can represent a single entry or data point. Each entry can contain one or more distinct values. In some cases, each entry (e.g., row) can be associated with one or more classification variables (e.g., columns of a table of timestamped data). For example, in a table representing environmental readings, each entry can include a timestamp, a value associated with parts per million of $NO_2$, a value associated with a county in which the reading was taken, a value associated with a state in which the county is located, and a value associated with a region in which the state is located.

In some cases, timestamped data can be partitioned in various fashions depending on a user's need. Timestamped data can be partitioned according to criteria (e.g., time series criteria). In the above example, the table of environmental readings can be partitioned according to state, such that all entries containing the same value in the state column can be grouped together into a time series. In the example, the number of different time series (e.g., number of groups) can depend on the number of different states present in the timestamped data. The criteria can relate to one or more different classification variables. In some cases, the criteria can relate to an ordered set of multiple classification variables. In an example with time series criteria relating to multiple classification variables, the time series criteria can relate to medical examination identifier and healthcare facility. In such an example, individual time series would be generated by grouping together all entries that have the same medical examination identifier and healthcare facility, thus generating a separate time series for each medical examination performed in each healthcare facility. The criteria for partitioning the timestamped data can be referred to as time series criteria or a "BY group."

Timestamped data can be stored as an input data set on any suitable storage device. Due to the large sizes involved and the importance of the data, timestamped data is often stored on a distributed file system (DFS). A DFS can comprise multiple storage devices and can comprise multiple file systems. A DFS can provide redundant and resilient storage of data. A DFS can break up large files into chunks, each of which can be stored on several storage media. It can also make redundant copies of each chunk to avoid the need for periodic backup copies. If a particular file system of the DFS fails, the DFS can resiliently heal itself without needing to restore backup copies. However, because of the nature of a DFS, data is not stored contiguously, and therefore sorting on a particular file system is not feasible. In other words, because data entries that are subsequent in time may be stored on different file systems of the DFS, it is impossible to sort these data entries without substantial reading and writing of the entire input data set. These inherent limitations with DFS cause particular problems for analysis of timestamped data, where ordering of the data is crucial. Further, multiple data entries associated with a single time series can be stored in multiple disparate files (e.g., chunks) of a DFS. Each of these files must be read, sorted, and merged with respect to time before being analyzed. Further, without knowing in advance which files must be read for a particular time series, current techniques may read all files of the input data set, not just those in which data entries for the time series are stored. Each time this process repeats, large amounts of data must be read, transferred, and processed.

Certain aspects of the present disclosure can make use of parallelized reading and deterministic distribution, which can enable time series to be built from timestamped data stored on a DFS in a scalable and efficient manner. Thus, certain aspects of the present disclosure can operate especially well with timestamped data stored on a distributed file system, although that need not always be the case.

A cluster of worker nodes can be defined for performing certain aspects of the present disclosure. Each worker node can be referred to as a computing device. The number of worker nodes can be easily scalable to any desired number, as needed. During deterministic distribution, the timestamped data of the input data set will be automatically partitioned, with the various time series spread relatively evenly across the worker nodes. The number of time series divided by the number of worker nodes will provide an approximate number of time series per worker node. Thus, if it is desired that the average number of time series per worker node be at a particular number and the number of time series is known, the number of worker nodes used can be scaled up or down to achieve the desired number of time series per worker node. The number of worker nodes can be scaled up or down for any other reason, such as per user configuration or based on estimated size of the input data set.

A script containing instructions for processing the time series can be distributed to each worker node. To facilitate easy scalability and operation in a cloud, the script can be sent to each node, which can then compile the script for the particular operating system of that node. Local compiling of the script can enable the use of heterogeneous clouds (e.g., clusters of nodes using different operating systems), which can improve scalability. Further, local compiling of the script can allow each node to optimize the executable for its own operating system, thus permitting fast execution of the specified instructions.

The script can contain instructions for generating and selecting models, selecting variables and events, performing time series manipulations and analysis (e.g., time series decomposition, modeling, signal analysis, and anomaly detection), and other processing steps. In some cases, the script can contain instructions for pre-processing timestamped data prior to analysis. In some cases, the script can contain instructions for post-processing results when generating the output data. In some cases, the script can contain information for partitioning the timestamped data, such as time stamp criteria. In some cases, the script can contain information for identifying one or more input data sets and/or information for generating one or more output data files. When received at a worker node, the script can be stored locally and compiled, or can be immediately compiled. In some cases, a worker node can share the script with other worker nodes. In some cases, a first worker node can share a compiled version of the script with other worker nodes having the same operating system as the first worker node. The compiled script can be in any suitable format, such as a dynamic link library (DLL) file.

The input data is read by the worker nodes from the file system (e.g., DFS). The worker nodes read the input data in parallel, with each node reading one or more files of the input data simultaneously. Each file can contain unsorted timestamped data. In some cases, each worker node can read unique files of the entire input data so that none of the input data is read twice from the DFS.

Upon receiving the timestamped data during or after the parallel read, each worker node can deterministically distribute the timestamped data based on the time series criteria. Since deterministic distribution is based on the time series criteria, deterministic distribution acts to automatically partition the timestamped data into groups that make up the various time series. Deterministic distribution involves generating a unique value (e.g., a hash value) based on the time series criteria for a particular entry of timestamped data, then using that hash value to assign that entry to a particular node of the cluster of worker nodes. The use of a modulo function with the unique value as the dividend and the number of worker nodes as the divisor will result in a number from 0 to n−1, where n is the number of nodes in the cluster of worker nodes. By associating each number 0 to n−1 with a node of the cluster of worker nodes, each time series can be repeatedly and reliably assigned to one of the worker nodes. Each worker node can be pre-assigned a device identifier from 0 to n−1. Thus, each number 0 to n−1 can be used as a destination identifier to identify the destination node by that node's device identifier. In some cases, the numbering of destination identifiers or destination nodes can be adjusted as necessary, such as by adding 1 to achieve numbers in the range of 1 to n. Thus, each node of the worker node cluster can be considered to be associated with one or more time series or one or more groups (e.g., groups based on the time series criteria).

In some cases, timestamped data associated with a group can be associated with one of the plurality of worker nodes (e.g., computing devices). In some cases, timestamped data associated with a group can be associated with only one (e.g., a single) of the plurality of worker nodes. However, in some cases, multiple worker nodes can be used to process timestamped data associated with a single group, such as for redundancy purposes. In such cases, timestamped data associated with a group can be associated with two or more of the plurality of worker nodes.

If a destination identifier for an entry of timestamped data is the same as the device identifier of the node that read that entry of timestamped data (e.g., local node), that node can retain that entry of timestamped data in local memory (e.g. memory allocated to the node). However, if the destination identifier matches the device identifier of another node, the local node can transmit that entry of the timestamped data to the other node (e.g., remote node or destination node).

In some cases, the local node can transmit entries of timestamped data individually, such as on-the-fly as the data is read by the local node. In some cases, however, the local node can compile together all of the timestamped entries it has read that are associated with a particular time series to create a bundle of timestamped entries. The local node can then transmit this bundle of timestamped entries to the destination node. In some cases, the local node can sort, accumulate, and/or compress the bundle of timestamped entries prior to transmission. In some cases, the local node can bundle together multiple bundles of timestamped entries that are associated with the same destination node for transmission as a bundle of bundles.

In some cases, a special condition can exist where entries of the timestamped data have zero values or null values across all of the time series criteria. In some cases, these entries can be separated into their own time series. In some cases, however, these entries can be transmitted to every node in use and can be included in every time series. The decision on how to handle this special condition can be user-selectable, such as within the distributed script. If these entries are to be added to each time series, they can be added during pre-processing, such as during the sorting and/or accumulation processes. For example, timestamped data regarding the ongoing use of equipment across several facilities can be used to determine when preventative maintenance should be performed and when repair technicians should be dispatched to the various facilities. Generally, this timestamped data can include a facility variable, which can be used to identify in which facility the particular piece of equipment is stored or used. If a piece of equipment exists or is used across multiple facilities (e.g., vehicles, communication lines, or distributed systems), it may be decided that timestamped data for use of that equipment should have a zero value or null value for its facility variable. Depending on the desired implementation, such cross-facility pieces of equipment can be separated into their own time series or can be included in all of the time series.

When distributed distribution is complete, all entries of the timestamped data that are associated with a particular time series are located on a single node as a grouping. In some cases, metadata can be included with or otherwise associated with each grouping to prevent it from being automatically partitioned (e.g., deterministically distributed) by the same time series criteria in the future. This metadata can be read to identify opportunities to skip over automatic partitioning of this data if the same time series criteria are used again.

After each node has received the timestamped data associated with its groups, the node can pre-process the timestamped data to generate a time series. Pre-processing the timestamped data can include sorting and accumulating the entries into the time series. Sorting can involve sorting the entries of the group into a temporally sequential order. Accumulating can involve merging and/or rewriting the data entries into a fixed-interval and fixed-length time series. Since the incoming timestamped data may have no fixed interval between entries and since the entries of a particular group may encompass varying ranges, it can be important to accumulate the data prior to analysis.

The fixed interval can refer to a common interval of time between each entry of the accumulated time series. In some cases, the fixed interval can be based on user settings, such as entries in the distributed script. In some cases, the fixed interval can be automatically selected based on the fixed length of the time series and/or the number of entries in the time series or a desired number of entries in the accumulated time series. In some cases, the fixed interval can be selected to maximize data granularity. In some cases, the fixed interval can be selected to achieve increased compression.

The fixed length can refer to the length of time between the first entry and last entry of the accumulated time series. In some cases, the fixed length can be based on user settings, such as entries in the distributed script. In some cases, the fixed length can be based on the time span of the input data. In some cases, lower and/or upper bounds for the fixed length can be based on user settings. In some cases, user settings can cause some entries of the timestamped data to be dropped when generating the time series, such as entries that occur before a lower bound for the fixed length.

As a result of the accumulation process, each time series across all of the worker nodes can have the same fixed interval and the same fixed length.

In some cases, no time series criteria may be given or all of the timestamped data may share the same values for the time series criteria, which can result in all of the timestamped data being associated with a single group. In such cases, this entire set of timestamped data may end up being distributed to a single node. Nevertheless, certain aspects of the present disclosure can reduce or minimize the burden on that destination node by spreading the reading process across all worker nodes and having each worker node perform at least some sorting, compression, or accumulation on its entries prior to transmitting them to the destination node. In some cases, each worker node can perform accumulation on its timestamped data prior to distribution to reduce the cardinality of the data (e.g., when accumulating data collected every second into per-week entries) and compress the data for faster transport to the destination node.

Due to the redundant nature of some distributed file systems, input data files read in parallel by multiple nodes may contain duplicative entries. In such cases, the duplicative entries can be efficiently eliminated, before or after distribution, during an accumulation process.

Once a worker node has one or more time series (e.g., accumulated time series), each time series can be processed according to the instructions of the distributed script. The processing can occur in parallel across all nodes. In some cases, each thread of a computing node can execute the compiled script in parallel on individual time series associated with that node. In some cases, each of the node's threads can be kept busy until all of the time series assigned to that node have been processed. Any errors can be logged in memory. As a result of this processing, output data can be generated. In some cases, one or more output data files can be created for each time series. The output data can be written to a destination, such as the distributed file system. The output data can be written in parallel.

In some cases, memory optimization can improve the speed and efficiency of each worker node. Optimization can involve efficiently reusing allocated memory to reduce or minimize the load that is placed on a server by increased thread usage on a computing server's virtual memory (VM) subsystem. VM subsystems request (e.g., allocate) or return (e.g., deallocate) memory in a serial fashion, one thread at a time, to prevent a race condition from corrupting its internal data structures. Thus, in multithreaded architectures, threads may stall for significant amounts of time as they wait in the queue for their turn to interact with the VM subsystem. As more threads are used, this problem can be exacerbated. When worker node clusters are used with multiple worker nodes, such as disclosed herein, this problem can be especially burdensome. Therefore, certain aspects of the present disclosure can provide optimization by efficiently reusing allocated memory, thus minimizing the number of VM subsystem queries made by the threads.

Efficient reuse of allocated memory can involve a node reusing allocated memory to process subsequent time series. In some cases, as when a node begins processing several time series, the node can allocate large chunks of memory (e.g., memory containers) from a VM subsystem. The node can subdivide its memory containers into smaller blocks of memory to instantiate required data objects (e.g., the time series arrays themselves) and computational objects (e.g., time series models and forecasting objects). The computational objects instantiated may depend on the type of processing delineated in the script. As the compiled script is executed, each thread of a node can request more memory containers on-demand from the VM subsystem if its existing memory containers become exhausted. Once a thread finishes processing a particular time series, instead of releasing its memory containers to the VM subsystem, the thread can retain its memory containers for reuse to process subsequent time series. In some cases, the portions of the memory containers that hold computational objects can be left intact, thus permitting reuse of such objects (e.g., time series models and forecasting objects). The portions of the memory containers that hold data objects can be released or overwritten, permitting data objects of the subsequent time series to be loaded into those portions of the memory containers. Additional memory containers can still be requested on-demand if the thread's existing memory containers become exhausted. After all time series for a particular node have been processed, all threads can release their memory containers back to the VM subsystem. Thus, a thread may interact with the VM subsystem as few as two times (e.g., once to request the memory and once to release the memory) despite processing any number of time series. Any additional interactions with the VM subsystem may occur only when the thread's existing memory containers become exhausted.

As a result of the memory optimization disclosed herein, certain aspects of the present disclosure are able to easily scale in number of threads (e.g., additional threads per node or additional nodes) with minimal contention on the VM subsystem. Further, the memory optimization disclosed herein can enable a worker node cluster having a limited number of nodes to perform faster than without such memory optimization, as the threads of the nodes will spend less time in queue for the VM subsystem to allocate or deallocate memory.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a block diagram that provides an illustration of the hardware components of a data transmission network 100, according to some aspects of the present disclosure. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. The computing environment 114 may include one or more other systems. For example, computing environment 114 may include a database system 118 or a communications grid 120. The computing environment 114 can include one or more processing devices (e.g., distributed over one or more networks or otherwise in communication with one another) that may be collectively be referred to herein as a processor or a processing device.

Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
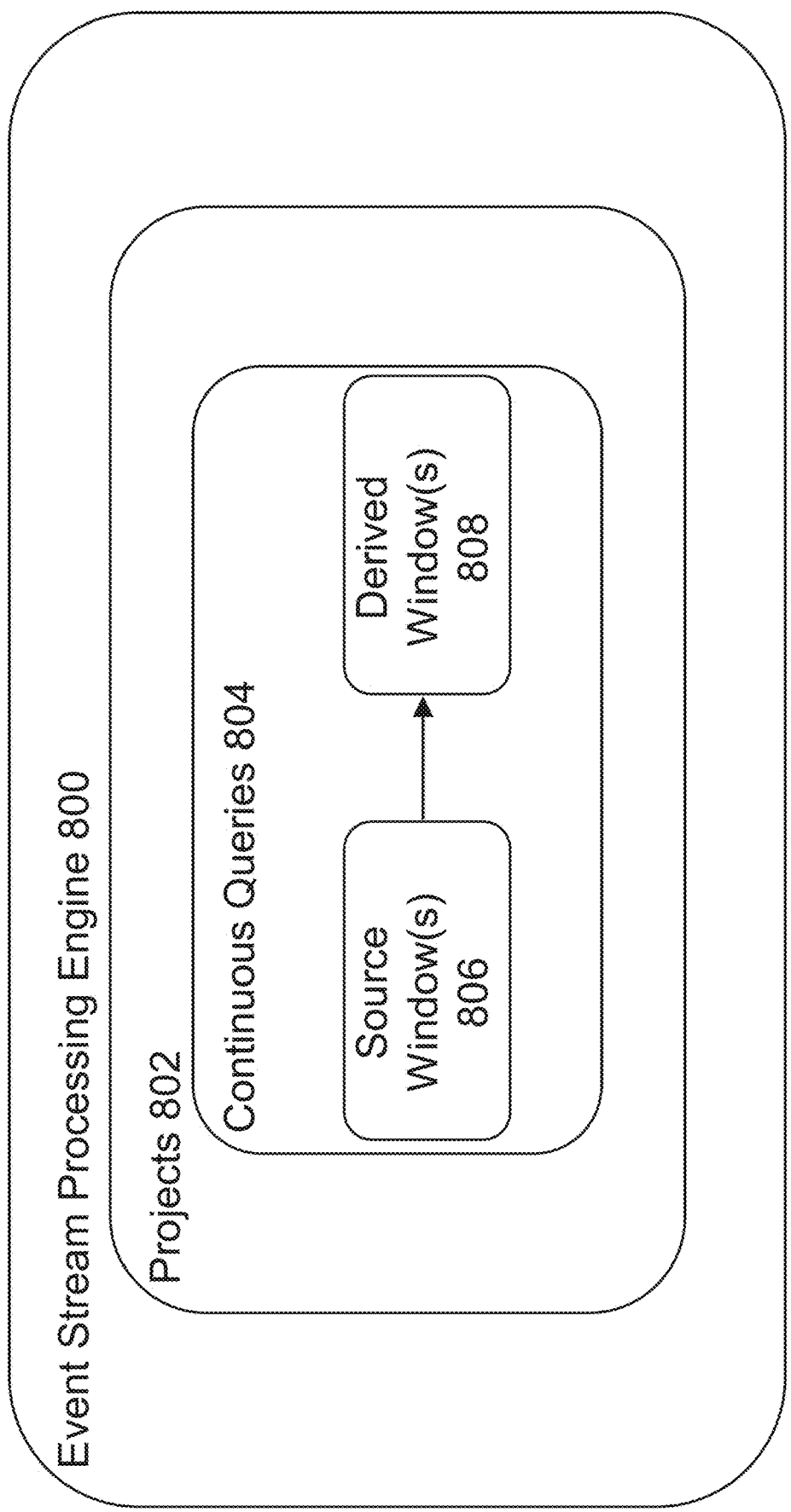
FIG. 8 illustrates a block diagram including components of an Event Stream Processing Engine (ESPE), according to certain aspects of the present disclosure.
Figure 9:
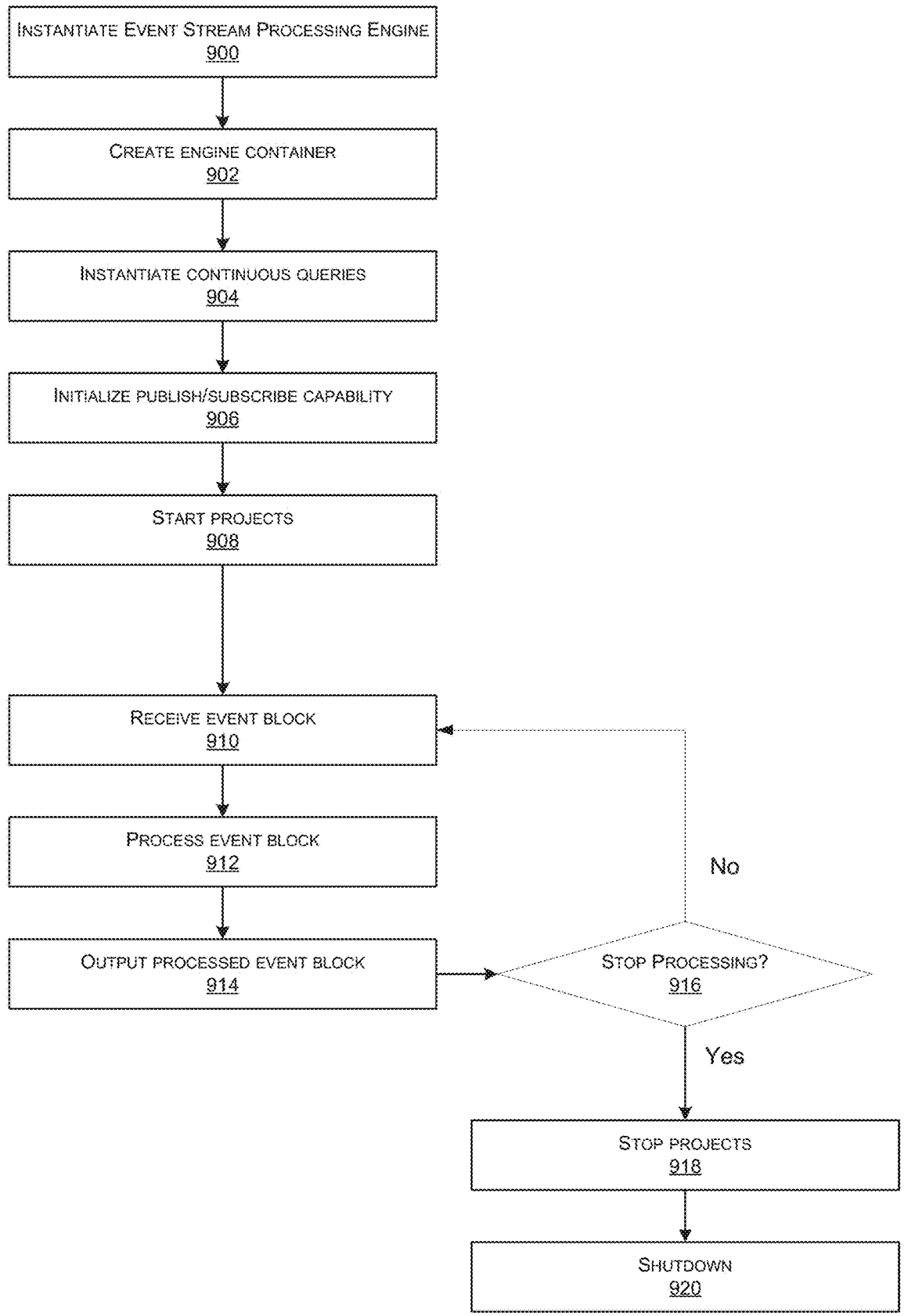
FIG. 9 illustrates a flow chart showing an example process including operations performed by an event stream processing engine, according to certain aspects of the present disclosure.
Figure 10:
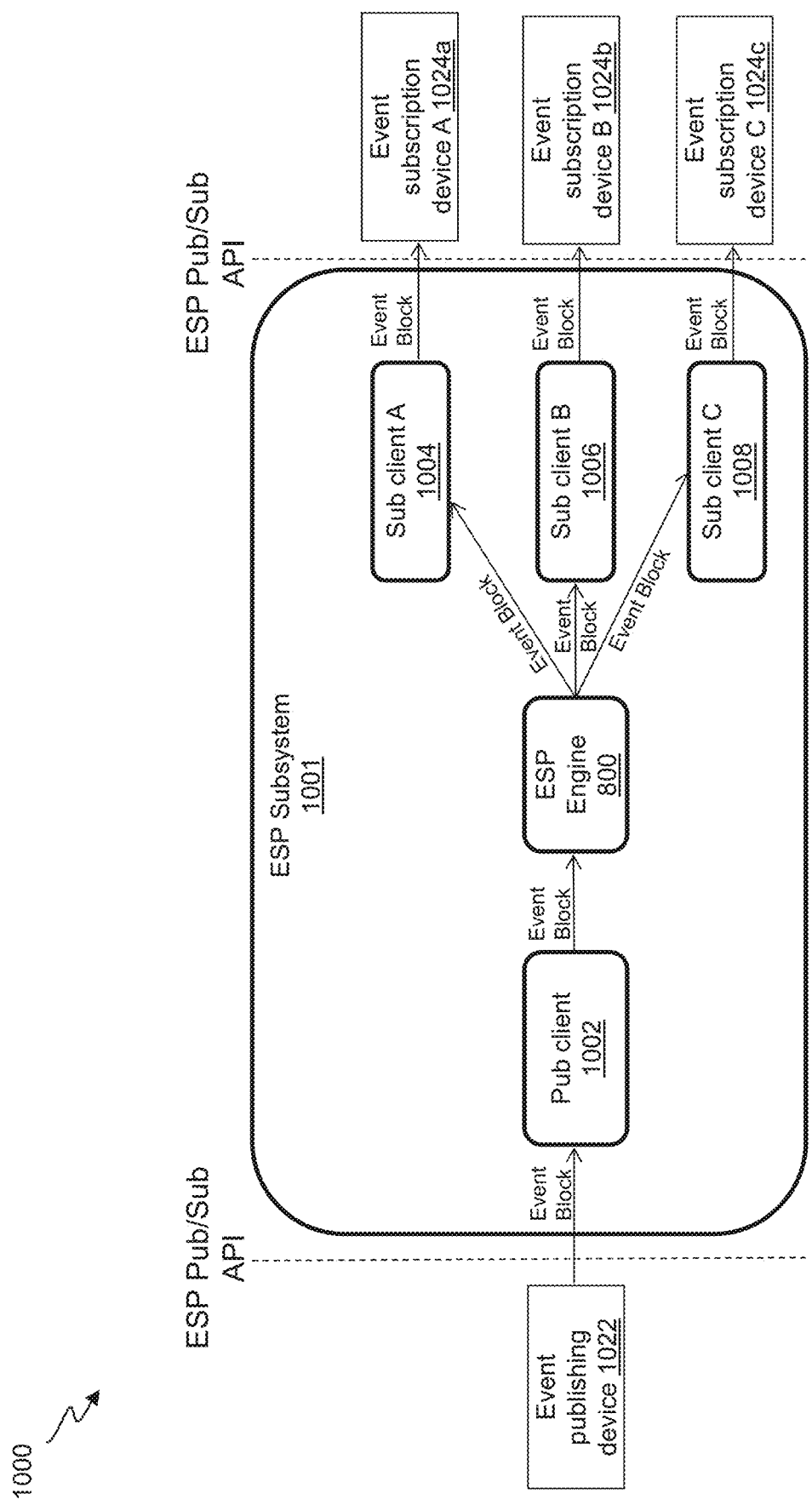
FIG. 10 illustrates an ESP system interfacing between a publishing device and multiple event subscribing devices, according to certain aspects of the present disclosure.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 108, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
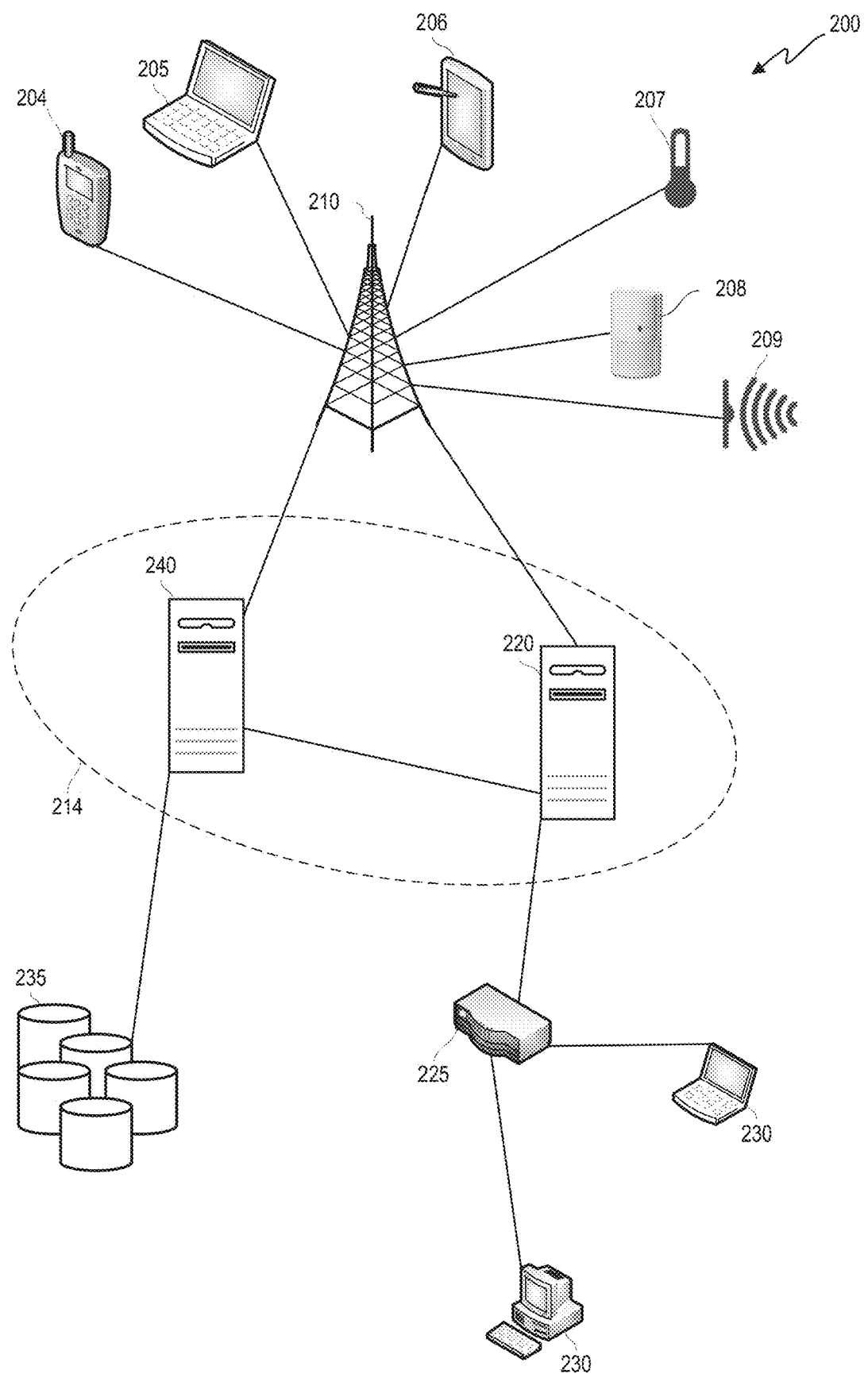
FIG. 2 illustrates an example network including an example set of devices communicating with each other over an exchange system and via a network, according to certain aspects of the present disclosure.

FIG. 2 illustrates an example network including an example set of devices communicating with each other over an exchange system and via a network, according to some aspects of the present disclosure. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
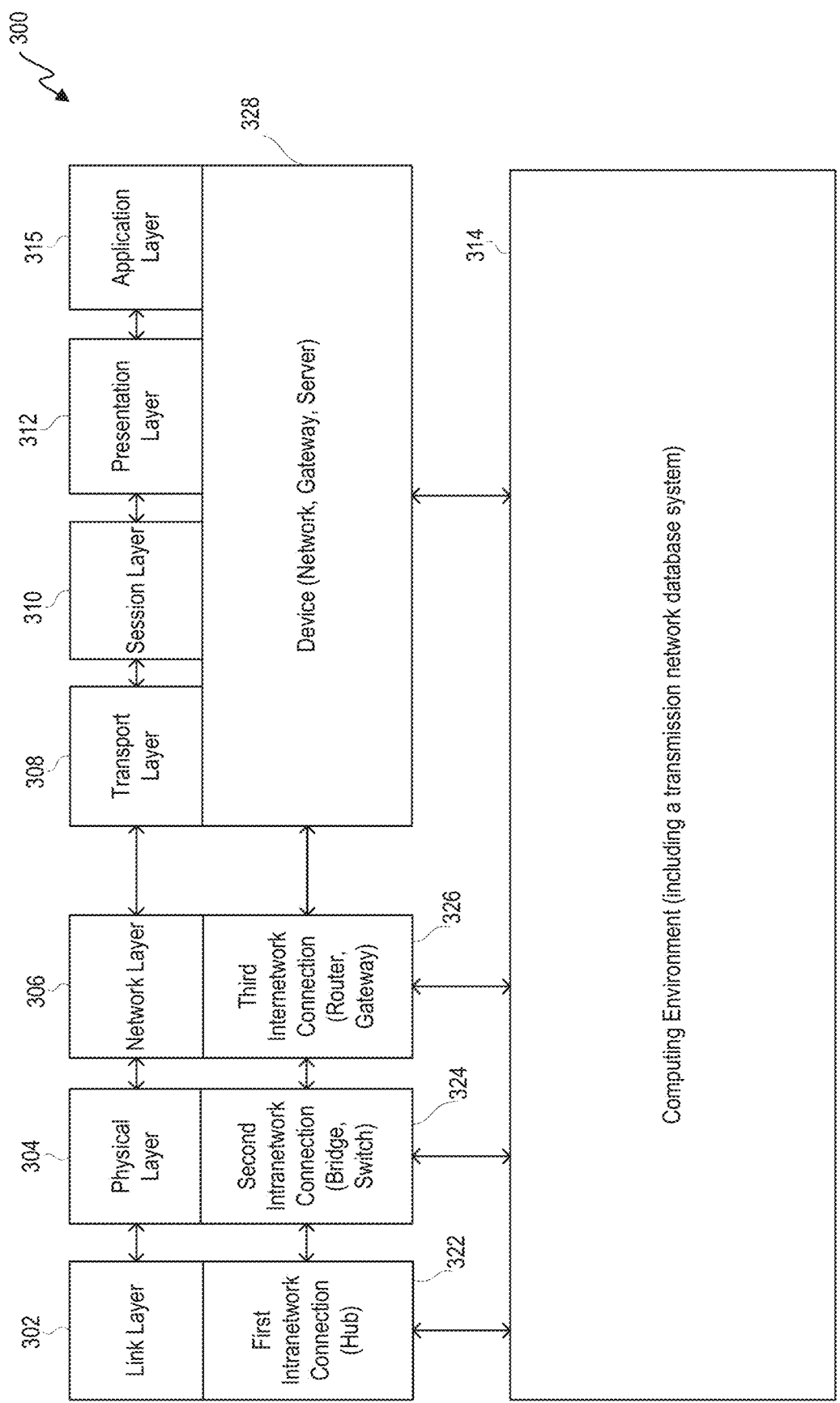
FIG. 3 illustrates a representation of a conceptual model of a communications protocol system, according to certain aspects of the present disclosure.

FIG. 3 illustrates a representation of a conceptual model of a communications protocol system, according to some aspects of the present disclosure. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 315 interacts directly with software applications and end users, and manages communications between them. Application layer 315 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-315. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
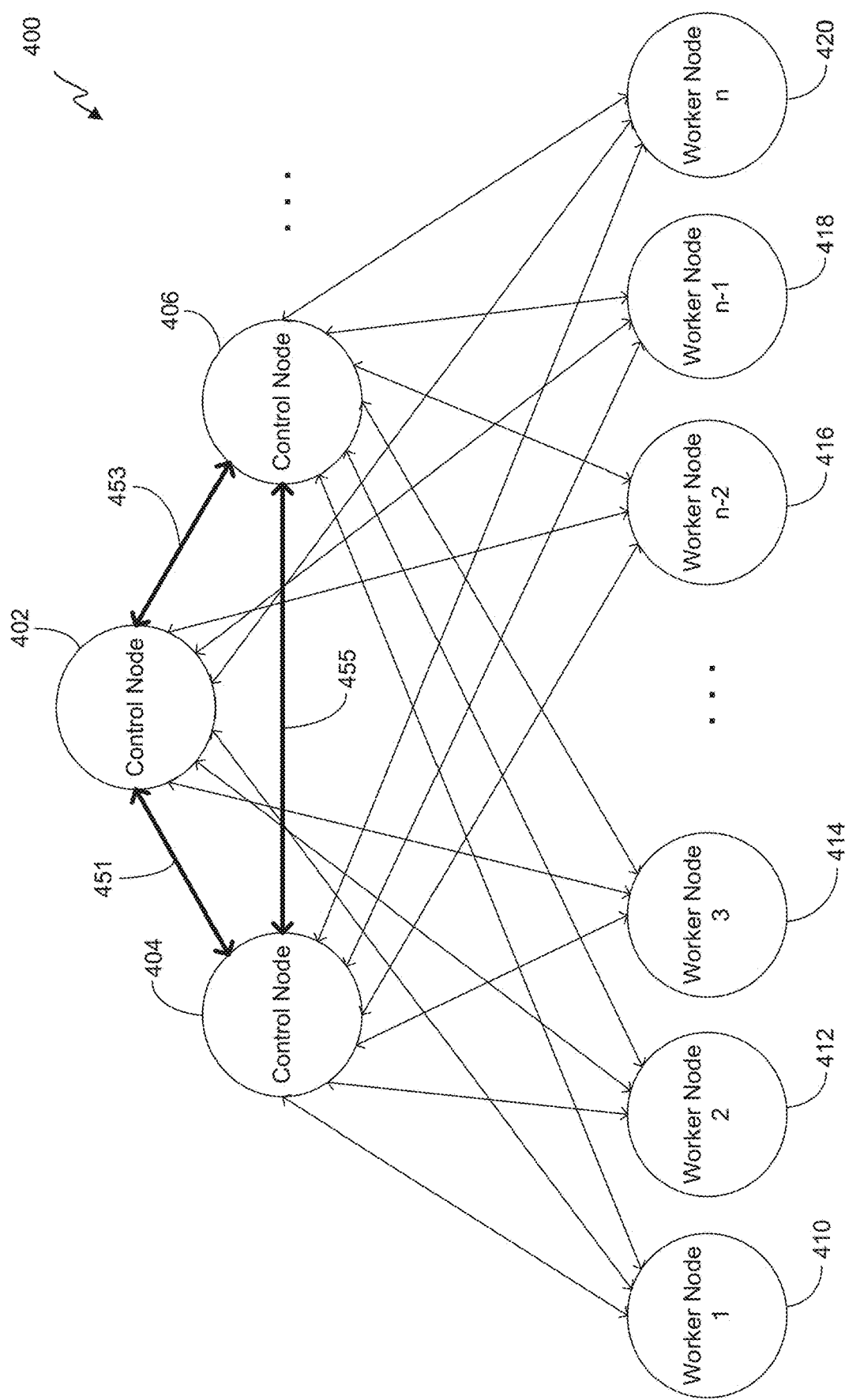
FIG. 4 illustrates a communications grid computing system including a variety of control and worker nodes, according to certain aspects of the present disclosure.

FIG. 4 illustrates a communications grid computing system 400 including a variety of control and worker nodes, according to some aspects of the present disclosure. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or fewer than three control nodes.

Communications grid computing system (or "just communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
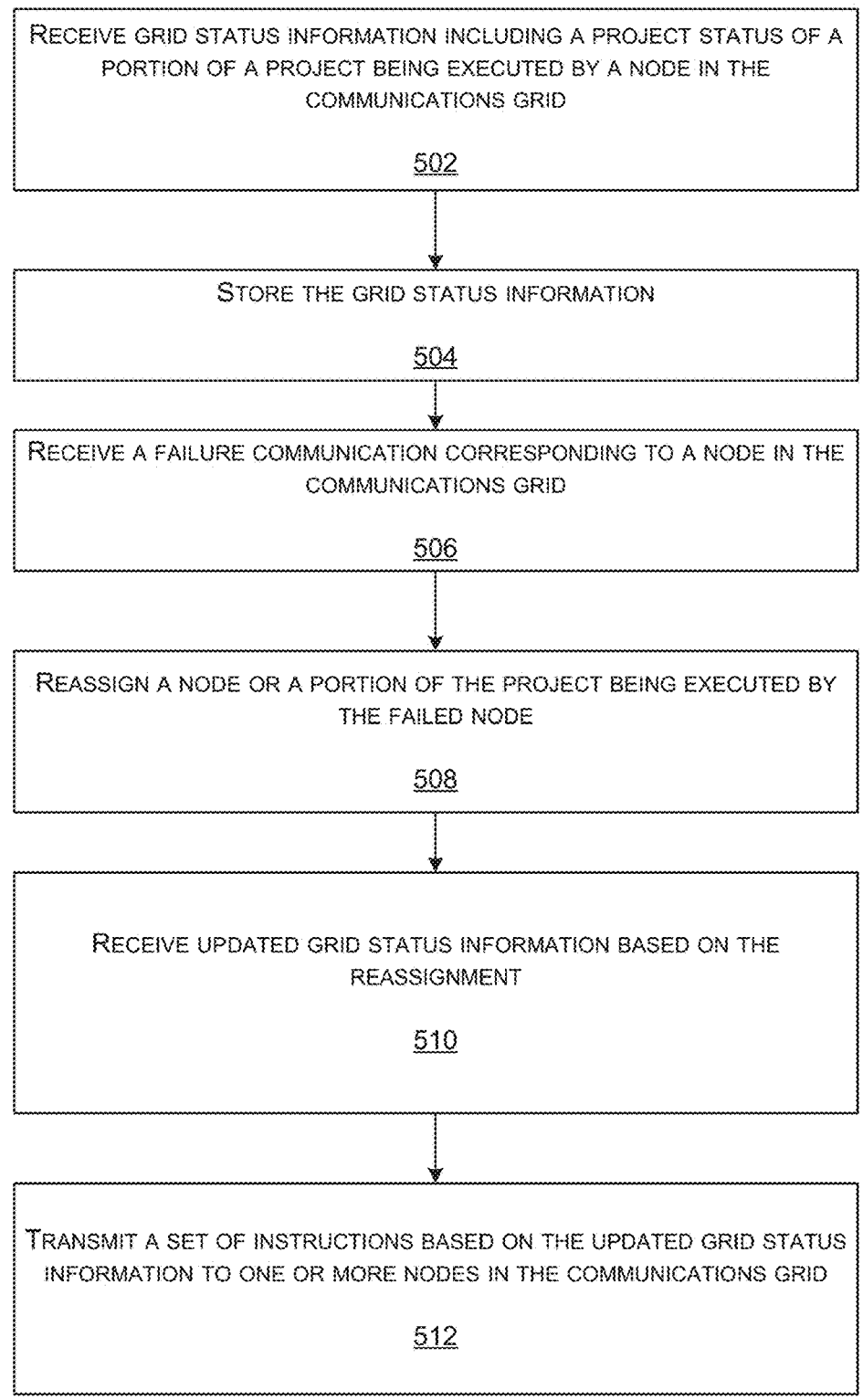
FIG. 5 illustrates a flow chart showing an example process for adjusting a communications grid or a work project in a communications grid after a failure of a node, according to certain aspects of the present disclosure.

FIG. 5 illustrates a flow chart showing an example process for adjusting a communications grid or a work project in a communications grid after a failure of a node, according to some aspects of the present disclosure. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
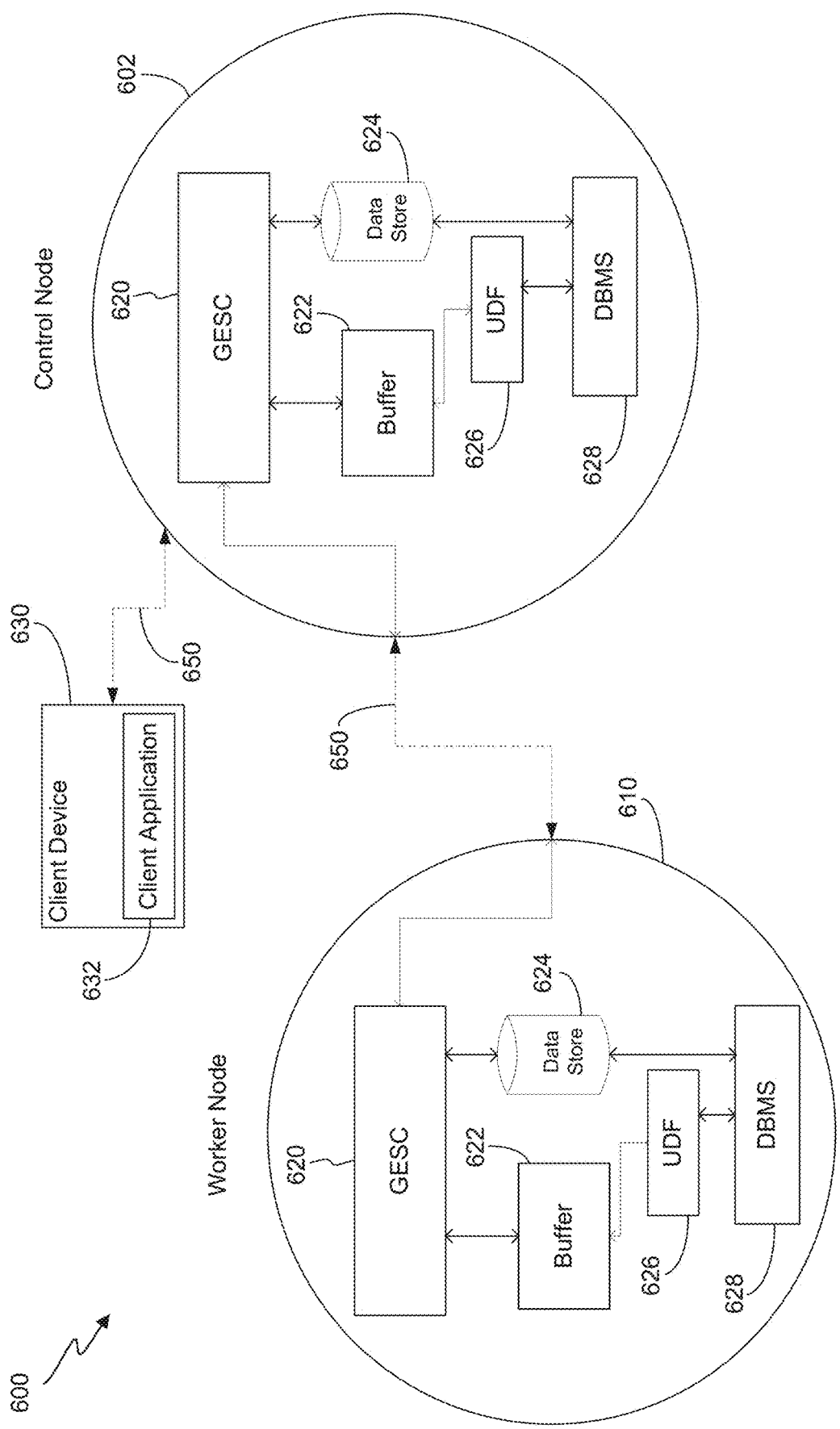
FIG. 6 illustrates a portion of a communications grid computing system including a control node and a worker node, according to certain aspects of the present disclosure.

FIG. 6 illustrates a portion of a communications grid computing system 600 including a control node and a worker node, according to some aspects of the present disclosure. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via communication path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1.

Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
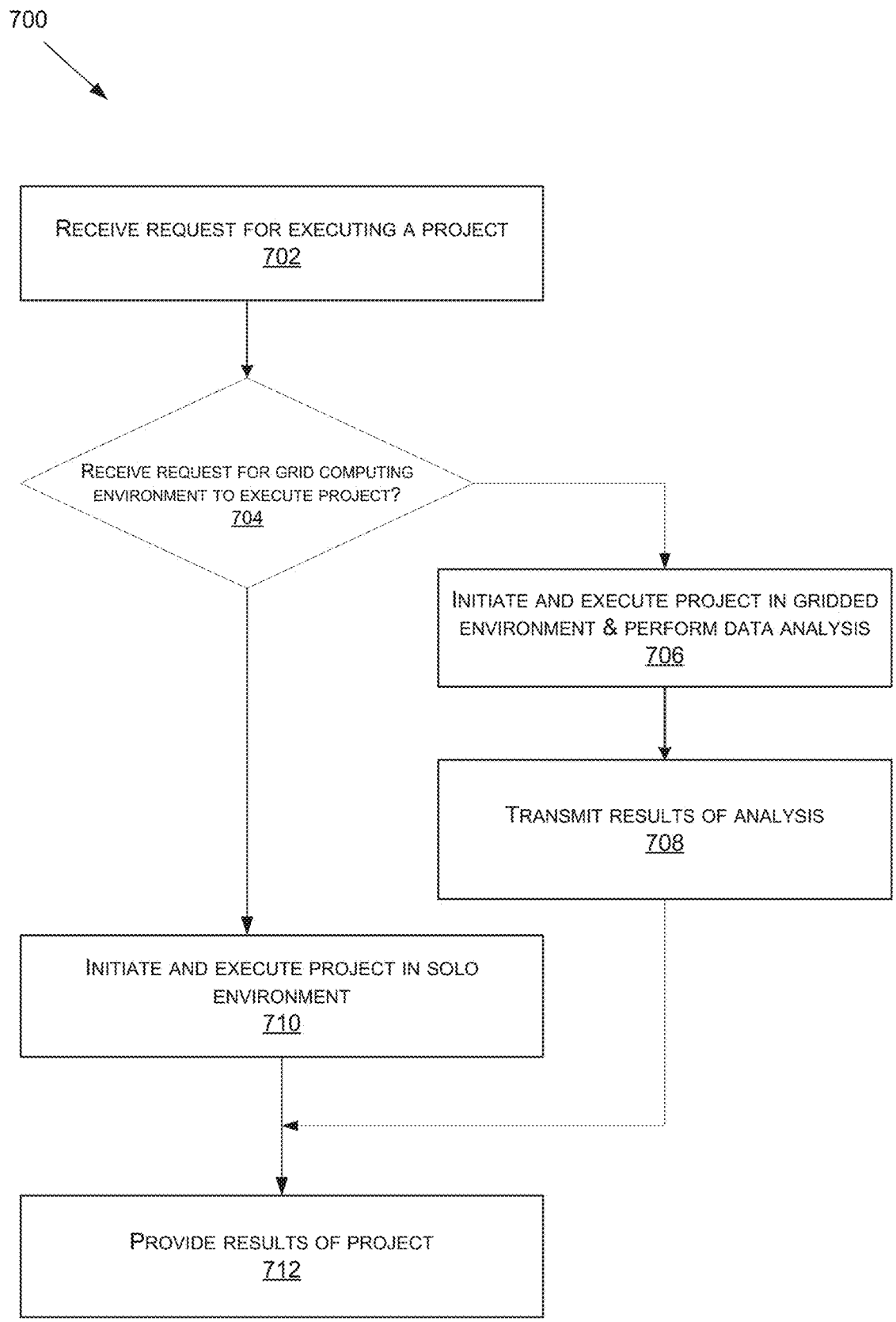
FIG. 7 illustrates a flow chart showing an example process for executing a data analysis or processing project, according to certain aspects of the present disclosure.

FIG. 7 illustrates a flow chart showing an example method for executing a project within a grid computing system, according to some aspects of the present disclosure. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to some aspects of the present disclosure. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some aspects of the present disclosure. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to some aspects of the present disclosure. ESP system 1000 may include ESP device or subsystem 1001, event publishing device 1022, an event subscribing device A 1024a, an event subscribing device B 1024b, and an event subscribing device C 1024c. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 806, and subscribing client C 808 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 804, subscribing client B 806, and subscribing client C 808 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
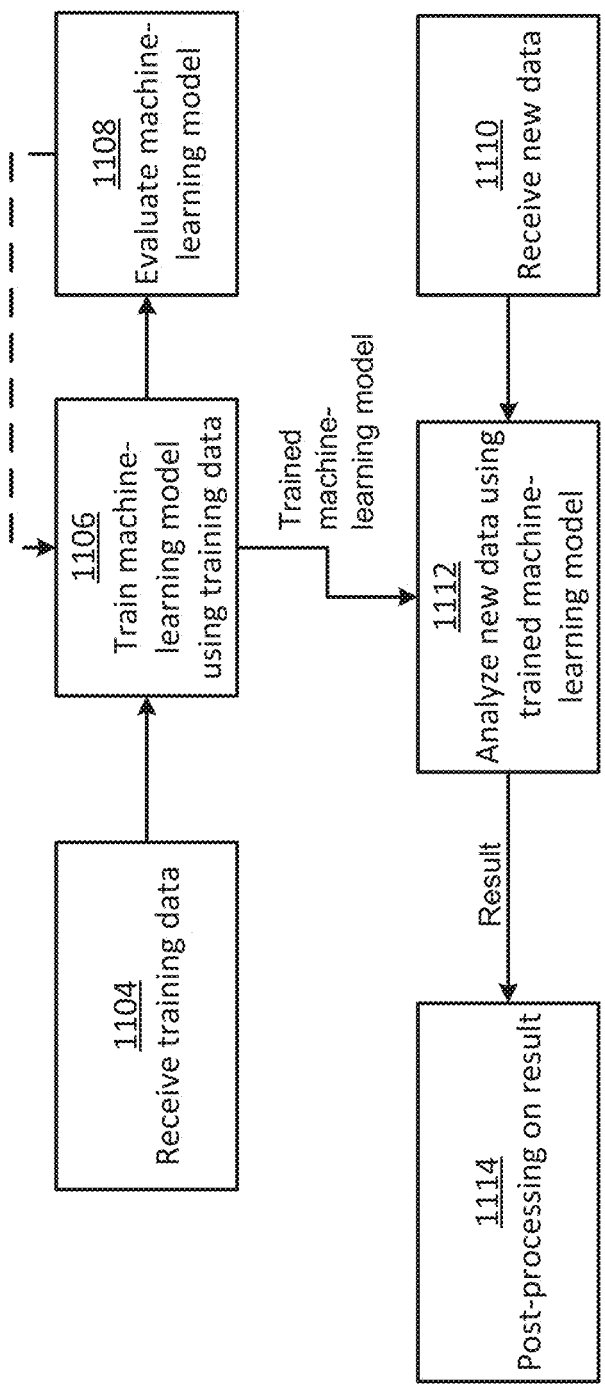
FIG. 11 illustrates a flow chart of an example of a process for generating and using a machine-learning model, according to certain aspects of the present disclosure.

FIG. 11 illustrates a flow chart of an example of a process for generating and using a machine-learning model, according to some aspects of the present disclosure. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these. Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
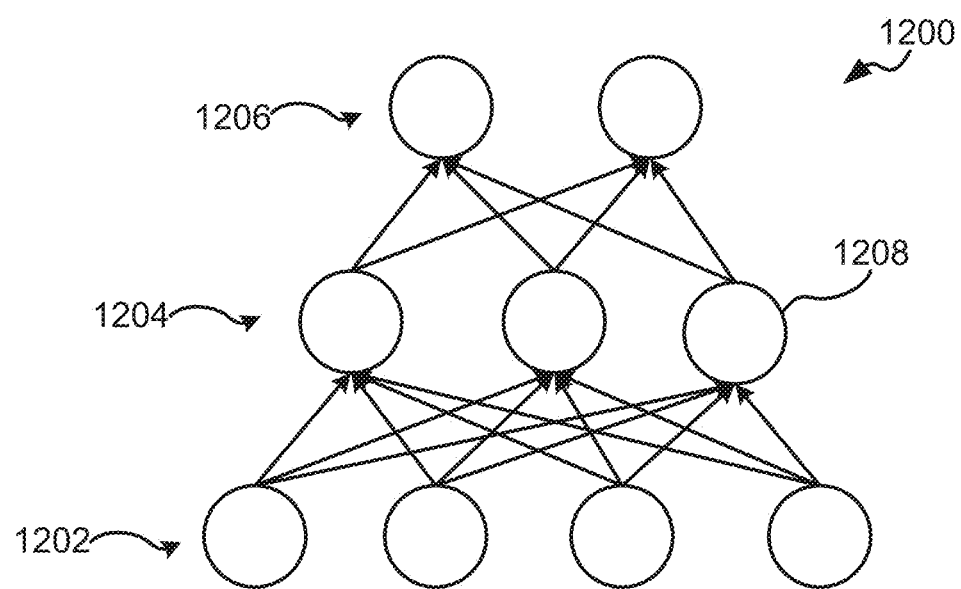
FIG. 12 illustrates a neural network that represents a more specific example of a machine-learning model, according to certain aspects of the present disclosure.

A more specific example of a machine-learning model is the neural network 1200 shown in FIG. 12, according to some aspects of the present disclosure. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation: $y = \max(x, 0)$, where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
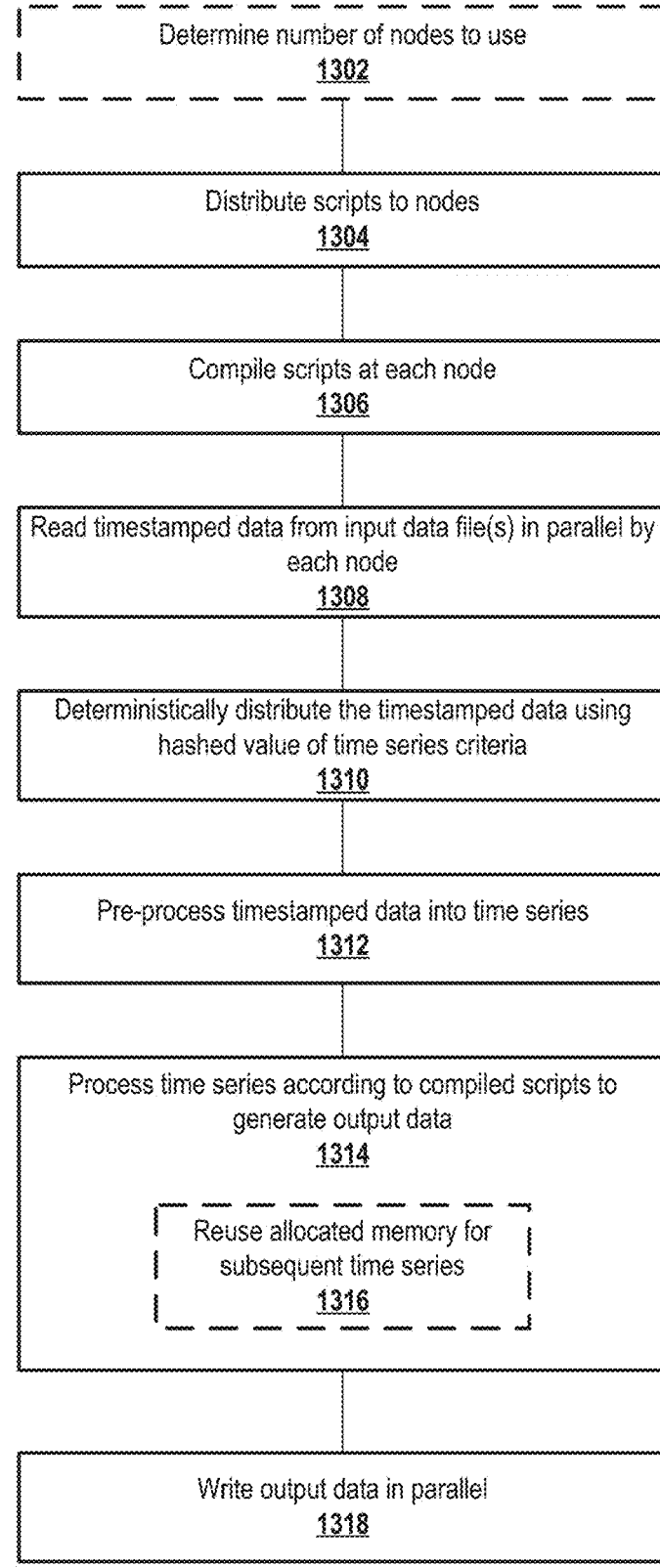
FIG. 13 is a flowchart depicting a process for distributing and analyzing timestamped data across multiple computing devices according to certain aspects of the present disclosure.

FIG. 13 is a flowchart depicting a process 1300 for distributing and analyzing timestamped data across multiple computing devices according to certain aspects of the present disclosure. At optional block 1302, a determination can be made as to the number of nodes to use. The determination can be based on available nodes, cost, predicted time to complete processing, size of input data, an actual or estimated number of groups based on time series criteria, or otherwise. In some cases, the determination can be preset based on user input. In some cases, determining a number of nodes at block 1302 can include identifying each of a set of nodes (e.g., cluster of worker nodes or set of computing devices) and storing the number of nodes in the set. As used herein, the number of nodes in a set can be referred to as n.

At block 1304, scripts are distributed to each node in the set of nodes. The script can be user-defined and can include information about the input data, the time series criteria, the type(s) of processing to perform on the time series, and the manner of outputting the results. The script can include other information as well. The script can be compilable and then executable by multiple operating systems. Distributing the script at block 1304 can include distributing the script to at least two nodes each having a different operating system (or different versions of the same operating system). Each node can receive an identical copy of the script. In some cases, distributing the script at block 1304 can include transferring the script from one worker node to another worker node, although that need not be the case.

At block 1306, the script is compiled at each node. Compiling the script can occur automatically when the script is received at a node. Compiling the script on a particular node can include compiling the script for the particular operating system in use by that particular node. As a result of block 1306, nodes having different operating systems may end up with compiled scripts that are not identical to one another in form, but nevertheless perform the same functions designated by the script. In some cases, compiling the script at block 1306 can include transferring a complied script from a first node to another node having the same operating system as the first node.

At block 1308, timestamped data is read from one or more input data files in parallel by each node of the set of nodes. The one or more data files can be stored on a distributed file system. Reading a data file in parallel can include each node reading a portion of the data file. In some cases, when timestamped data is spread across multiple data files, reading the timestamped data in parallel can include each node reading different file(s) of the multiple data files. In some cases, after reading timestamp data at block 1308, all of the timestamped data will be stored in memory across the set of nodes.

At block 1310, the timestamped data is deterministically distributed. The timestamped data can be deterministically distributed across the set of nodes. Deterministically distributing an entry of timestamped data can include identifying a group associated with the entry by determining that entry's values associated with the time series criteria. Those values associated with the time series criteria can be formatted text value and hashed to generate a hash value. Any suitable hashing algorithm can be used. In some cases a fast hashing algorithm with low collisions is used. The hash value can be fed into a modulo function with the number of nodes (n) to obtain a number between 0 and n−1, which can be used as a destination identifier. That particular entry can then be transferred, if necessary, and stored upon the node associated with the destination identifier (e.g., the node whose device identifier matches the destination identifier). As a result of this deterministic distribution, the timestamped data is automatically partitioned according to time series criteria. In some cases, deterministic distribution at block 1310 can occur on the fly as timestamped data is being read at block 1308. In other cases, however, deterministic distribution at block 1310 can occur after completion of reading timestamped data at block 1308.

As described in further detail herein, transmission of timestamped data to a destination node can occur one entry at a time, or can occur with bundles of entries. In some cases, when transmission of timestamped data to a destination node occurs with bundles of entries, bundles of entries can be pre-processed (e.g., via sorting, accumulation, or compressing) before being transmitted to the destination node.

At block 1312, the timestamped data can be pre-processed on each node. For a particular node, this timestamped data can include entries retained by that node during distribution at block 1310, as well as entries received from other nodes during distribution at block 1310. Each grouping of timestamped data on a node (e.g., group based on time series criteria) can be pre-processed separately into its own time series. Pre-processing can include sorting the timestamped data in a temporally sequential manner. Pre-processing can include accumulating the timestamped data into fixed-length or fixed-interval time series. Sorting is often followed by accumulation, although that need not always be the case. In some cases, additional pre-processing can occur at block 1312.

At block 1314, each node processes its time series according to the compiled script from block 1306. Processing a time series at block 1314 can include executing the compiled script from block 1306 on the time series. Processing at block 1314 can occur in parallel, with each node processing time series contemporaneously. In some cases, each node can itself process multiple time series in parallel using multiple threads. Nodes can have one or more threads. Processing at block 1314 can continue for all time series, resulting in output data. Processing a single time series at block 1314 can result in one or more items of output data, which can be stored in one or more files.

In some cases, at optional block 1316, allocated memory can be reused for processing subsequent time series during processing at block 1314. In such cases, a single node and/or a single thread of a node can request memory allocation, can process a first time series using this allocated memory, can process a second time series using this same allocated memory without releasing the memory, and can later release the allocated memory. Thus, the node and/or thread can reduce the number of memory allocations and releases that occur during processing at block 1314.

At block 1318, the output data can be written to an output destination. In some cases, output data can be written to a distributed file system, such as the same file system used to supply the input data at block 1308. Output data can be written by the nodes in parallel.

Figure 14:
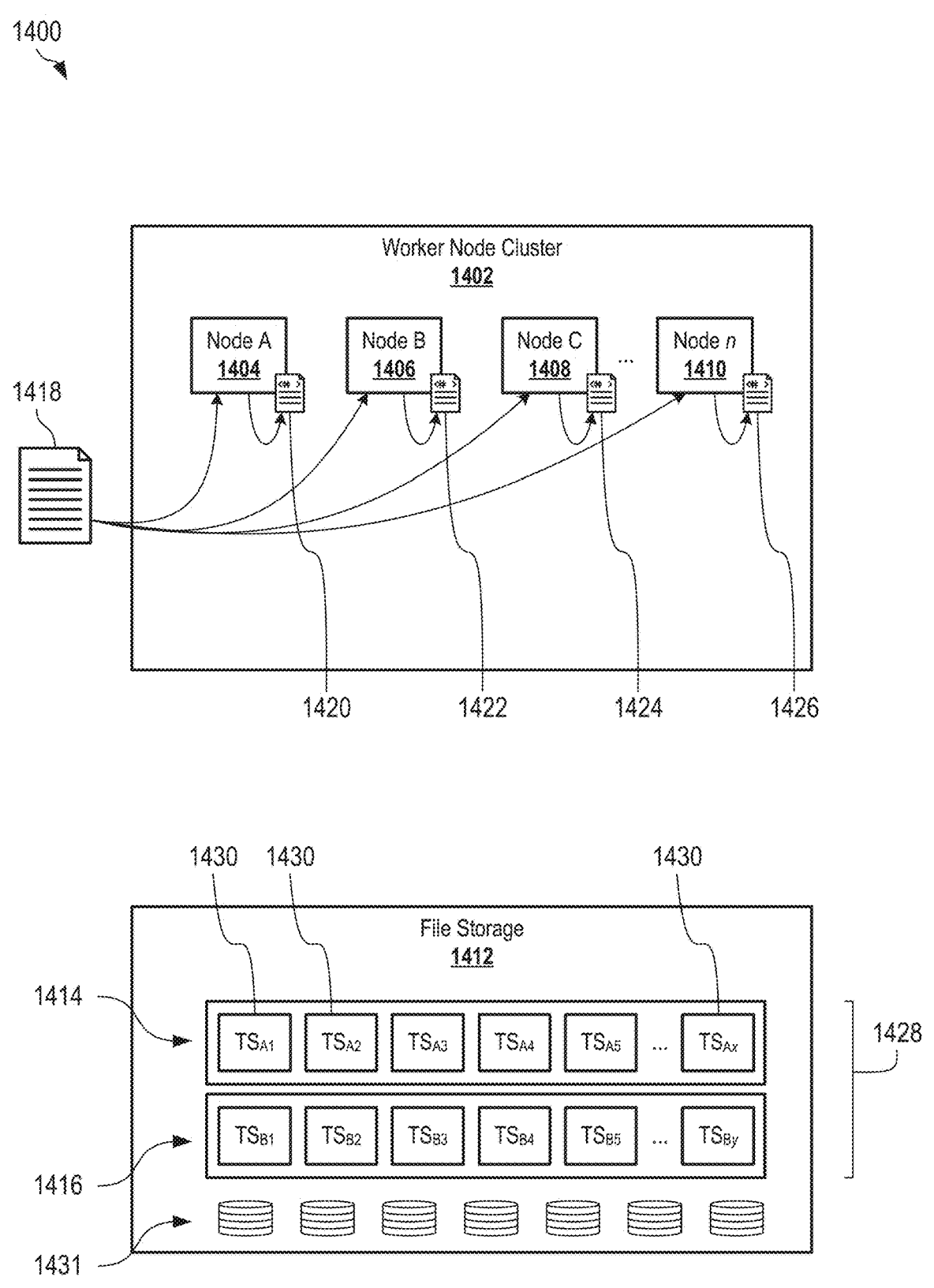

FIG. 14 is a schematic diagram depicting script distribution in a computing environment 1400 according to certain aspects of the present disclosure. The computing environment 1400 can include a worker node cluster 1402 and a file storage 1412. The computing environment 1400 can be used to perform process 1300 of FIG. 13.

The file storage 1412 can be a distributed file system or other suitable storage system for storing the timestamped data 1428. The file storage 1412 can comprise a set of storage devices 1431 upon which the timestamped data 1428 is stored. The set of storage devices 1431 can include one or more storage devices, although seven are depicted in FIG. 14.

The timestamped data 1428 can include data entries (e.g., records) stored in any suitable fashion. In some cases, entries are stored in one or more tables, such as tables 1414, 1416. Tables 1414, 1416 in FIG. 14 are depicted schematically as containing a set of time series 1430 to illustrate the inherent content of the tables 1414, 1416, however it is noted that the actual data entries as stored in the tables 1414, 1416 may not be stored in any sorted or grouped (e.g., by time series) format. As depicted for illustrative purposes, table 1414 contains x number of time series 1430 (e.g., time series $TS_{A1}$ through time series $TS_{Ax}$) and table 1416 contains y number of time series 1430 (e.g., time series $TS_{B1}$ through time series $TS_{By}$). In some cases, a table 1414, 1416 may contain zero, one, or a plurality of time series 1430.

The worker node cluster 1402 is responsible for reading, distributing, and processing the timestamped data 1428. The worker node cluster 1402 can include any number of nodes (e.g., computing devices), although it may generally include a plurality of nodes. As depicted in FIG. 14, the worker node cluster 1402 contains n nodes ranging from Node A 1404, Node B 1406, and Node C 1408 up through Node n 1410.

As seen in FIG. 14, a script 1418 is distributed to each of the nodes 1404, 1406, 1408, 1410. After or upon distribution of the script 1418, each node 1404, 1406, 1408, 1410 can compile the script 1418 into its own compiled script 1420, 1422, 1424, 1426 (e.g., its own executable). Compiling can be operating-system-specific and/or hardware-specific, such that compiled script 1420 is compiled specifically for Node A 1404 (e.g., compiled specifically for the operating system of Node A, compiled specifically for the hardware of Node A, or compiled specifically for the combination of operating system and hardware of Node A), compiled script 1422 is compiled specifically for Node B 1406, compiled script 1424 is compiled specifically for Node C 1408, and compiled script 1426 is compiled specifically for Node n 1410.

Figure 15:
FIG. 15 is a schematic representation of a table of timestamped data and a resultant grouping of time series according to certain aspects of the present disclosure.

FIG. 15 is a schematic representation of a table 1500 of timestamped data and the associated set of groups 1514 according to certain aspects of the present disclosure. Table 1500 can be tables 1414, 1416 of FIG. 14. Table 1500 can include one or more entries having data associated with a timestamp. As depicted in FIG. 14, the table 1500 includes at least eight rows corresponding to at least eight entries of timestamped data (e.g., Row 1 1544, Row 2 1546, Row 3 1548, Row 4 1550, Row 5 1552, Row 6 1554, Row 7 1556, and Row 8 1558). Each row can contain a timestamp 1532 and any number of columns of data. As depicted in FIG. 14, each row contains a timestamp 1532 and at least five columns (e.g., Column A 1534, Column B 1536, Column C 1538, Column D 1540, and Column E 1542). For each row, the value contained the columns can represent data associated with the timestamp 1532. In some cases, values can be zero or nonzero.

Set of groups 1514 depict how the rows of table 1500 can be partitioned under one example set of time series criteria. The time series criteria used for the set of groups 1514 is the ordered pair of Column A 1534 and Column C 1538. Thus, for each unique combination of values for Column A 1534 and Column C 1538, all data entries (e.g., rows) that match that unique combination are grouped together into a grouping. For illustrative purposes, each group of the set of groups 1514 is identified by its unique combination of values for Column A 1534 and Column C 1538 (e.g., "<0,0>") and a time series label (e.g., "TSAI") corresponding to the time series that may result from that group.

As depicted in FIG. 15, Row 1 1544 is the only entry in the group associated with the <0,0> value for Column A 1534 and Column C 1538. Since both Row 2 1546 and Row 3 1548 contain the same <0,2> value for Column A 1534 and Column C 1538, they are grouped together. This pattern of grouping repeats until the final time series associated with values <3,4> for Column A 1534 and Column C 1538, which is fulfilled by Row 5 1552 and Row 8 1558.

Table 1500 can represent the timestamped data as stored in the input data. After each entry of table 1500 is read and deterministically distributed (e.g., using the unique values for the time series criteria, such as <Column A, Column C> hashed modulo the number of nodes), the timestamped data will be spread across the set of nodes according to the set of groups 1514. Pre-processing the timestamped data at each node will result in the time series (e.g., time series $TS_{A1}$ through time series $TS_{Ax}$).

Figure 16:
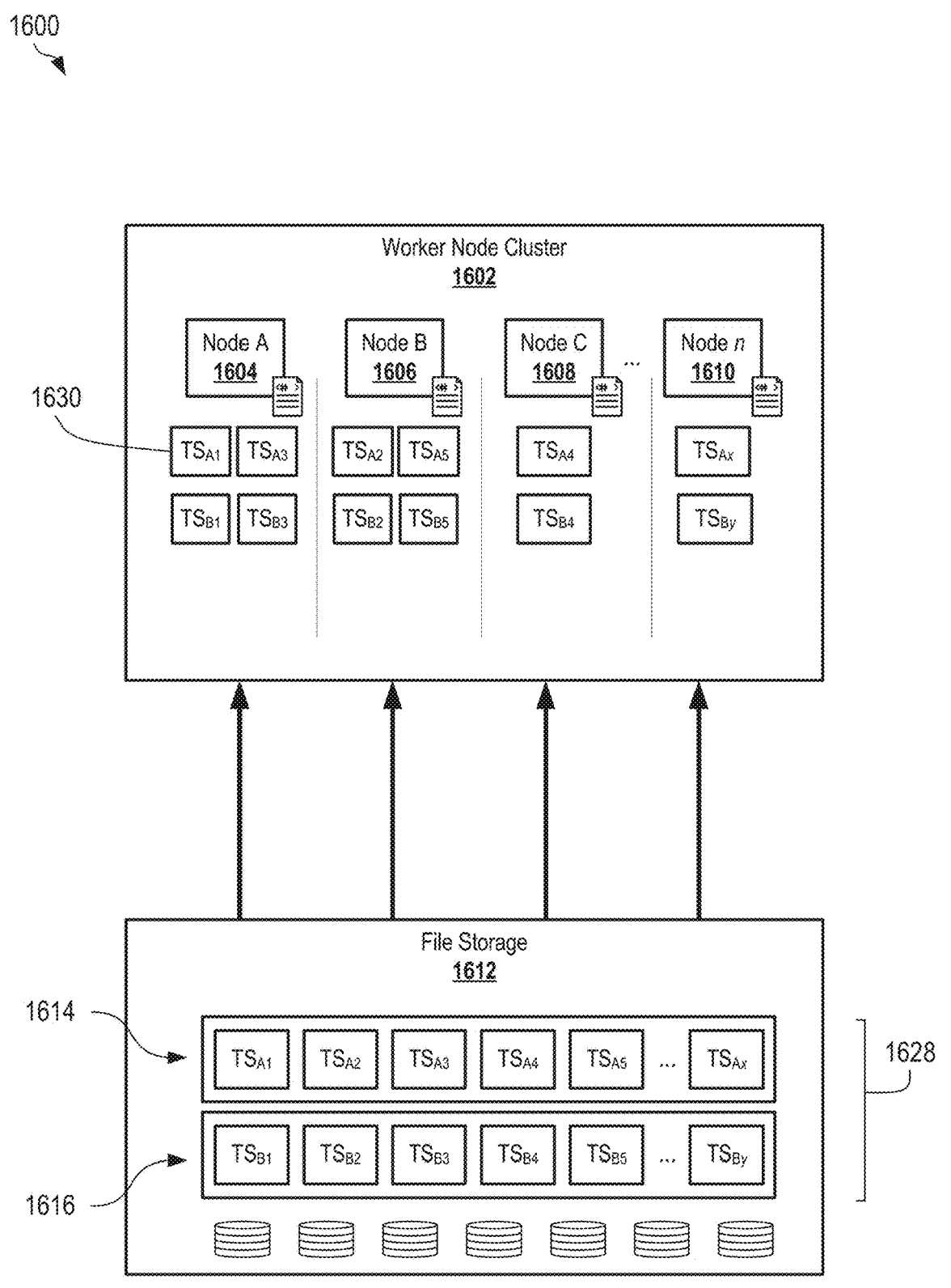

FIG. 16 is a schematic diagram depicting timestamp data 1628 in a computing environment 1600 after partitioning and distribution according to certain aspects of the present disclosure. The computing environment 1600 can include a worker node cluster 1602 and a file storage 1612. The computing environment 1600 can be used to perform process 1300 of FIG. 13. The computing environment 1600 shown in FIG. 16 can be during and/or after deterministic distribution and preprocessing at blocks 1310, 1312 of FIG. 13.

The timestamped data 1628 can be read in parallel by the nodes 1604, 1606, 1608, 1610 of the worker node cluster 1602. In some cases, the timestamped data can include multiple tables 1614, 1616. Reading and processing of multiple tables can occur sequentially or in parallel. For example, when multiple tables are processed in sequence, the time series of a first table can be read and optionally processed before the reading of time series of a second table; and when multiple tables are processed in parallel, the time series across both a first and second table can be read and optionally processed in parallel. As described herein, after parallel reading, dynamic distribution, and pre-processing, each node will have in memory one or more time series 1630. As depicted in FIG. 16, Node A 1604 stores and is associated with $TS_{A1}$, $TS_{A3}$, $TS_{B1}$, and $TS_{B3}$. In some cases, if the time series criteria and values in different tables are identical, the hash value will be identical, resulting in those entries being sent to the same node (e.g., $TS_{A1}$ and $TS_{B1}$ sent to Node A 1604). The various time series 1630 can be distributed substantially evenly across all nodes 1604, 1606, 1608, 1610 of the worker node cluster 1602. As used herein, distributed substantially evenly can include each node having the same number of time series or each node having no more than one or two time series more than the other nodes.

Figure 17:
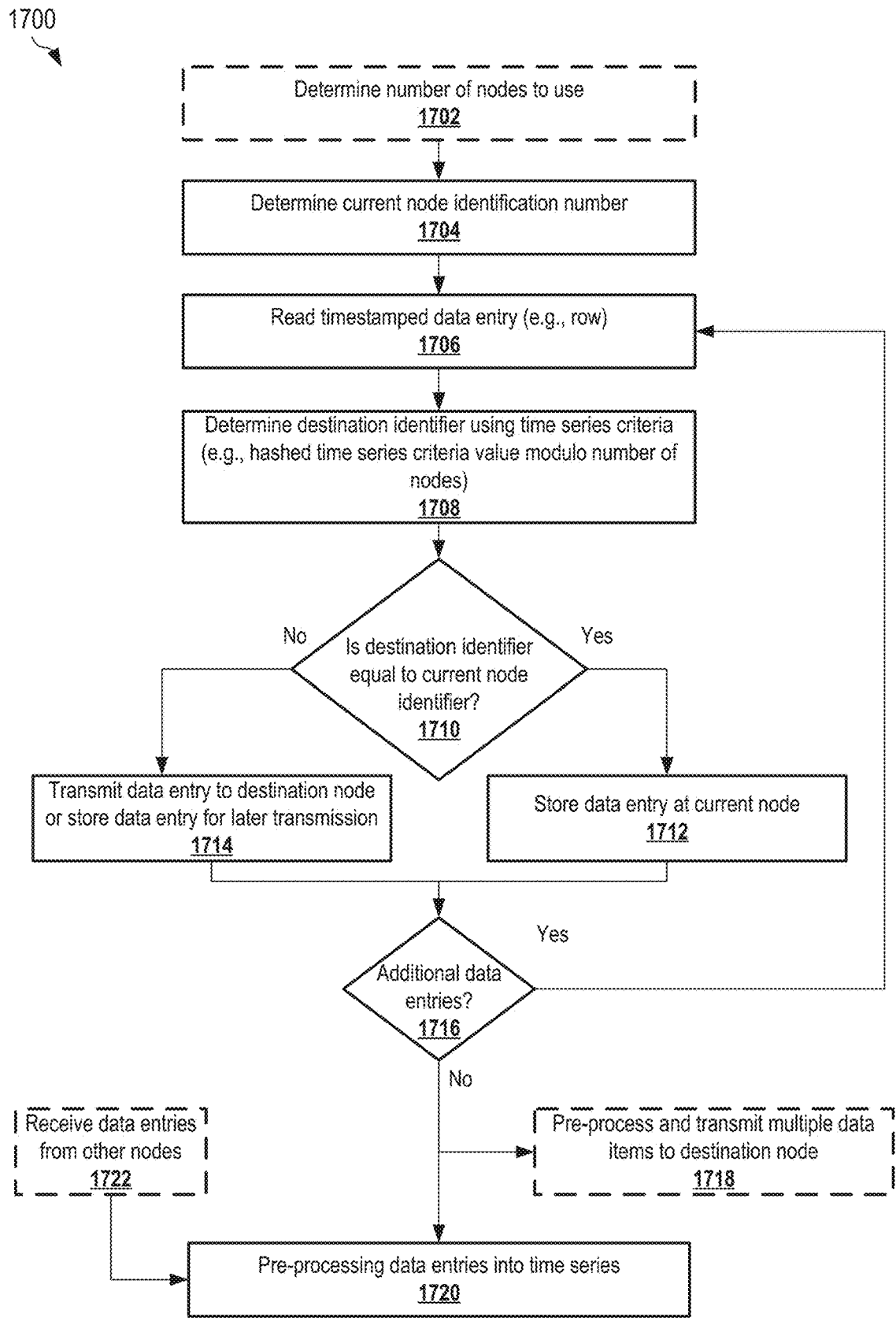
FIG. 17 is a flowchart depicting a process for partitioning and distributing timestamped data according to certain aspects of the present disclosure.

FIG. 17 is a flowchart depicting a process 1700 for distributing timestamped data according to certain aspects of the present disclosure. Process 1700 can occur during block 1310 of process 1300 of FIG. 13. Process 1700 can be performed at each node (e.g., Node A 1404 of FIG. 14). At optional block 1702, the number of nodes to use can be determined. Determining the number of nodes to use at block 1702 can be similar to, identical to, or the same as determining the number of nodes at block 1302 of FIG. 13. In some cases, determining the number of nodes to use at block 1702 can include receiving the number of nodes to use from a remote source (e.g., a control node or another node) or reading the distributed script.

At block 1704, an identification number for the current node can be determined. The identification number (e.g., device identifier) can be preset, assigned, or otherwise reserved for the current node. Each node in the worker node cluster will have a unique identification number. Identification numbers can range from 0 to n−1, from 1 to n, or otherwise.

At block 1706, a timestamped data entry (e.g., a row or record) can be read. In some cases, reading the timestamped data entry occurs as part of parallel reading at block 1308 of FIG. 13. In other cases, reading the timestamped data entry can occur after completion of parallel reading at block 1308 of FIG. 13.

At block 1708, a destination identifier is determined. The destination identifier is determined by performing a modulo operation on a hash of the text-formatted value(s) of the time series criteria for a given data entry with the number of nodes (n) as the divisor. The result of this calculation will be a number from 0 to n−1, which can be used as the destination identifier.

At block 1710, a determination is made whether the destination identifier of block 1708 matches the node identification number of block 1704. If the destination identifier matches the identification number of the current node, the process 1700 will continue at block 1712 by storing the data entry at the current node. If the destination identifier does not match the identification number of the current node, the process 1700 continues at block 1714 by either transmitting the data entry to the destination node or temporarily storing the data entry for later transmission to the destination node. The destination node can be the node having a device identification number that matches the destination identifier for the data entry (e.g., the destination identifier for the group associated with the data entry).

After block 1712 or block 1714, a determination can be made at block 1716 as to whether there exists additional data entries to distribute. If there are additional data entries to distribute, the process 1700 can continue at block 1706 with the next timestamped data entry. If there are not additional data entries to distribute, the process can continue at block 1720 with pre-processing (e.g., sorting and accumulating) the data entries associated with the current node into a time series. In some cases, the data entries pre-processed at block 1720 can include both data entries stored at block 1712 and data entries received from other nodes at block 1722.

In some cases, if distribution of data entries is to be performed in bulk rather than on-the-fly, the data entries stored at block 1714 can be optionally pre-processed and then transmitted to the destination node at block 1718. Block 1718 can involve pre-processing and transmitting multiple bundles of data entries to multiple nodes.

Figure 18:
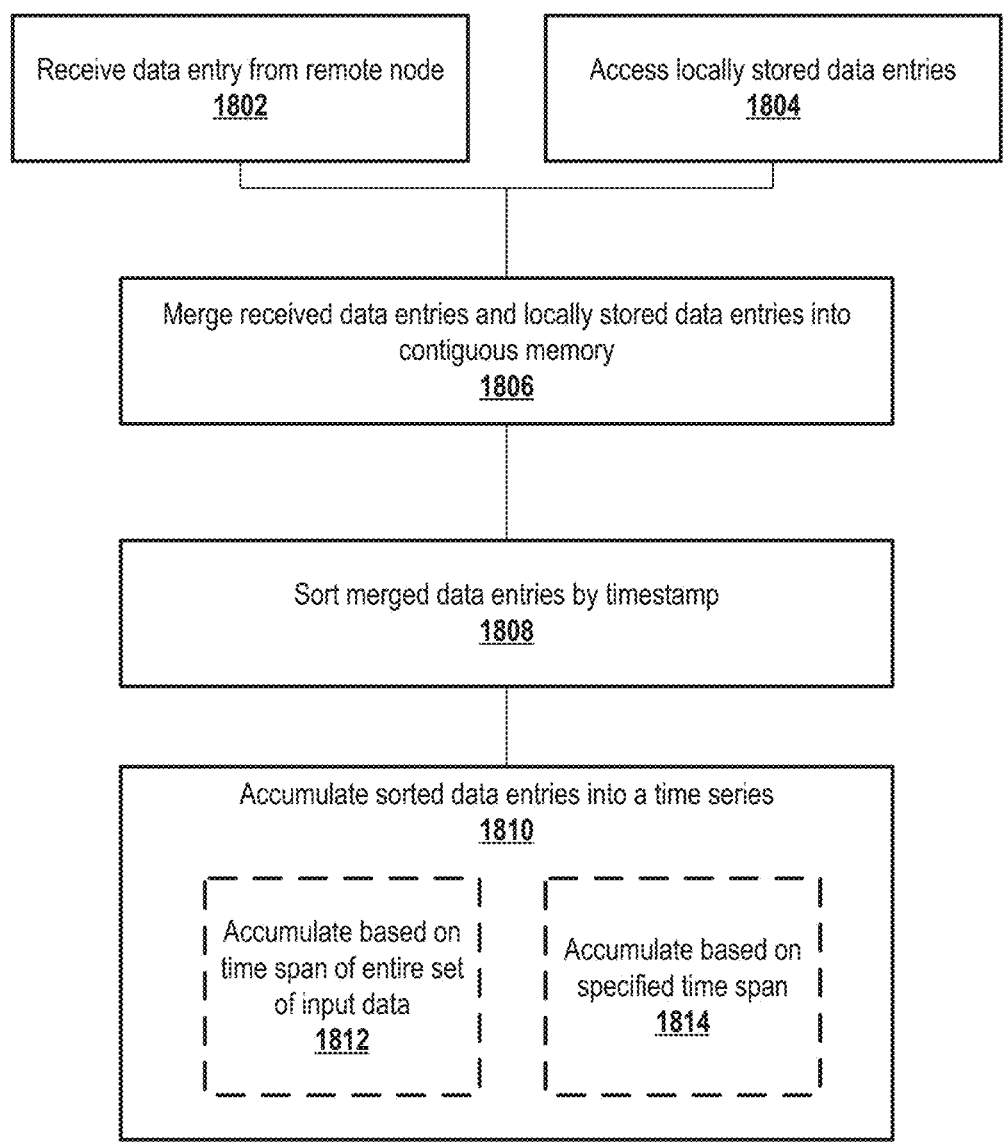
FIG. 18 is a flowchart depicting a process for pre-processing timestamped data into time series according to certain aspects of the present disclosure.

FIG. 18 is a flowchart depicting a process 1800 for pre-processing timestamped data into time series according to certain aspects of the present disclosure. Process 1800 can occur during block 1312 of process 1300 of FIG. 13. Process 1800 can be performed at each node (e.g., Node A 1404 of FIG. 14). Process 1800 can occur for all data entries associated with a particular group (e.g., a particular unique set of values for the time series criteria) to result in a time series. In some cases, a node may perform process 1800 multiple times, once for each group of data entries associated with that node.

At block 1802, one or more data entries are received from a remote node, such as at block 1722 of FIG. 17. In some cases, no data entries are received from a remote node. At block 1804, locally stored data entries are accessed, such as data entries stored at block 1712 of FIG. 17.

In some cases, blocks 1806, 1808, and 1810 can occur as part of block 1720 of FIG. 17.

At block 1806 the data entries received from remote nodes at block 1802 are merged with the locally stored data entries accessed at block 1804. Merging at block 1806 results in all of the data entries of the group being stored in contiguous memory.

At block 1808, the merged data entries are sorted by timestamp. Sorting by timestamp can result in a set of data entries that are chronologically ordered.

At block 1810, the sorted data entries from block 1808 can be accumulated into a time series. Accumulation can comprise translating the sorted data entries into a set of new data entries each having a fixed interval. Each of the new data entries can represent all of the sorted data entries from block 1808 that fall within the interval set by that new data entry. For example, if three different sorted data entries occur within the same one-hour period, accumulation to a fixed interval of one hour may result in a new data entry with values that are the sums of respective values from the three original sorted data entries. In some cases, accumulation can incorporate operations other than summing, such as computing an average, min, max, median, standard deviation, and others.

Accumulation at block 1810 can also involve generating the new data entries such that they cover a particular fixed length of time (e.g., a time period). In some cases, at optional block 1812, this fixed length of time can be based on a time span of the entire set of input data. In some cases, at optional block 1814, this fixed length of time can be based on a specified time span. Basing a fixed length of time on a specified time span can include setting a start time and/or end time, which can pin the fixed length to those start and/or end times. In some cases, basing a fixed length of time on a specified time span can include setting a lower bound and/or an upper bound, which can limit the start time and/or end time of a fixed length of time to the lower and upper boundaries, respectively. In some cases, blocks 1812 and 1814 are both used during accumulate at block 1810.

After accumulation at block 1810, the new data entries result in the fixed-interval, fixed-length time series associated with the group (e.g., associated with the particular unique set of values for the time series criteria).

Figure 19:
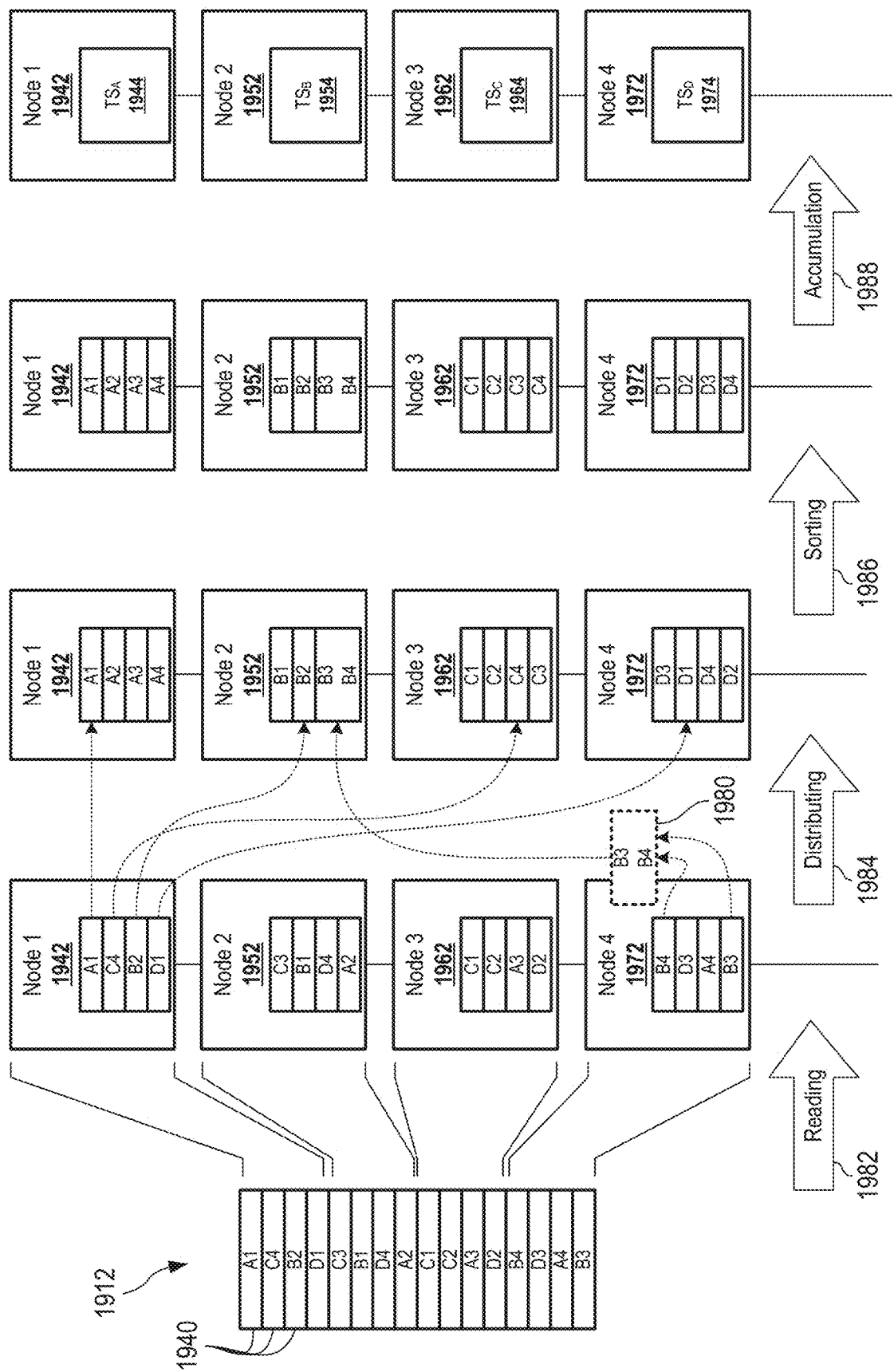
FIG. 19 is a multi-part schematic diagram depicting parallel reading, partitioning, sorting, and accumulation of timestamped data according to certain aspects of the present disclosure.

FIG. 19 is a multi-part schematic diagram depicting reading, distributing, sorting, and accumulation of timestamped data 1912 according to certain aspects of the present disclosure. The aspects illustrated in FIG. 19 move generally from left to right as time passes. The aspects illustrated in FIG. 19 may be performed on the computing environment 1400 of FIG. 14.

The timestamped data 1912 is a collection of data entries 1940 each containing data associated with a timestamp. The timestamped data 1912 can be stored on one or more devices of a storage system (e.g., a distributed file system), across one or more files. Each data entry 1940 of the timestamped data 1912 can be associated with a particular group based on unique values of the time series criteria. For illustrative purposes, each data entry 1940 is designated with a letter and a number (e.g., "A1"), with the letter representing the group and the number representing the chronological order of the entry within that group. As depicted in FIG. 14, the data entries 1940 of the timestamped data 1912 are not arranged in any specific order, whether by group or chronological.

During a reading process 1982, the timestamped data 1912 can be read in parallel by the nodes (e.g., Node 1 1942, Node 2 1952, Node 3 1962, and Node 4 1972). As depicted in FIG. 19, each node reads a portion of the timestamped data 1912, storing that portion of data in its own internal memory.

During a distribution process 1984, the various data entries 1940 are distributed across the nodes 1942, 1952, 1962, 1972. Distribution can occur as outlined in process 1700 of FIG. 17. The destination node to which the data entries 1940 are distributed is determined by performing a modulo operation on a hash of the text-formatted value(s) of the time series criteria for the given data entry 1940 with the number of nodes (4) as the divisor. For example, as depicted in FIG. 19, the following calculations are used, where H(x) is the hash of the text-formatted value(s) of the time series criteria for group "x" and % is the modulo operator.

$H(A)\% \ 4=1$ $H(B)\% \ 4=2$ $H(C)\% \ 4=3$ $H(D)\% \ 4=4$

As a result, all data entries 1940 associated with groups "A," "B," "C," and "D" will be directed to Node 1 1942, Node 2 1952, Node 3 1962, and Node 4 1971, respectively. For illustrative purposes, the movement of data entries 1940 is depicted, in dotted line, for only a select few data entries 1940. For example, data entry A1 remains in Node 1 1942, data entry C4 is distributed to Node 3 1962, data entry B2 is distributed to Node 2 1952, and D1 is distributed to Node 4 1972. Additionally, for data entries B3 and B4 that were originally read by Node 4 1971, the entries can be bundled into bundle 1980 and optionally preprocessed (e.g., sorted, accumulated, and/or compressed) prior to distributing the bundle 1980 to Node 2 1952.

As depicted in FIG. 19, after the distributing process 1984, the groups of data entries 1940 can be stored in each node, with each node containing data entries having a common letter value (e.g., "A1," "A2," "A3," and "A4" sharing the common letter value "A").

As is depicted in Node 3 1962 after the distributing process 1984 and before the sorting process 1986, the received data entries 1940 may not necessarily be stored in any sorted order. With respect to Node 3 1962 after the distributing process 1984, data entries C1 and C2 may have remained in memory, data entry C4 may have been appended to that memory from Node 1 1942, and data entry C3 may have thereafter been appended to that memory from Node 2 1952.

During a sorting process 1986, the data entries 1940 within each node can be sorted chronologically. As depicted in FIG. 19, the data entries 1940 can be sorted in ascending numerical order. The sorting process 1986 can occur as described with reference to block 1808 of FIG. 18.

During an accumulation process 1988, the sorted data entries 1940 within each node can be accumulated together into a fixed-interval, fixed-length time series (e.g., $TS_A$ 1944, $TS_B$ 1954, $TS_C$ 1964, and $TS_A$ 1974).

Figure 20:
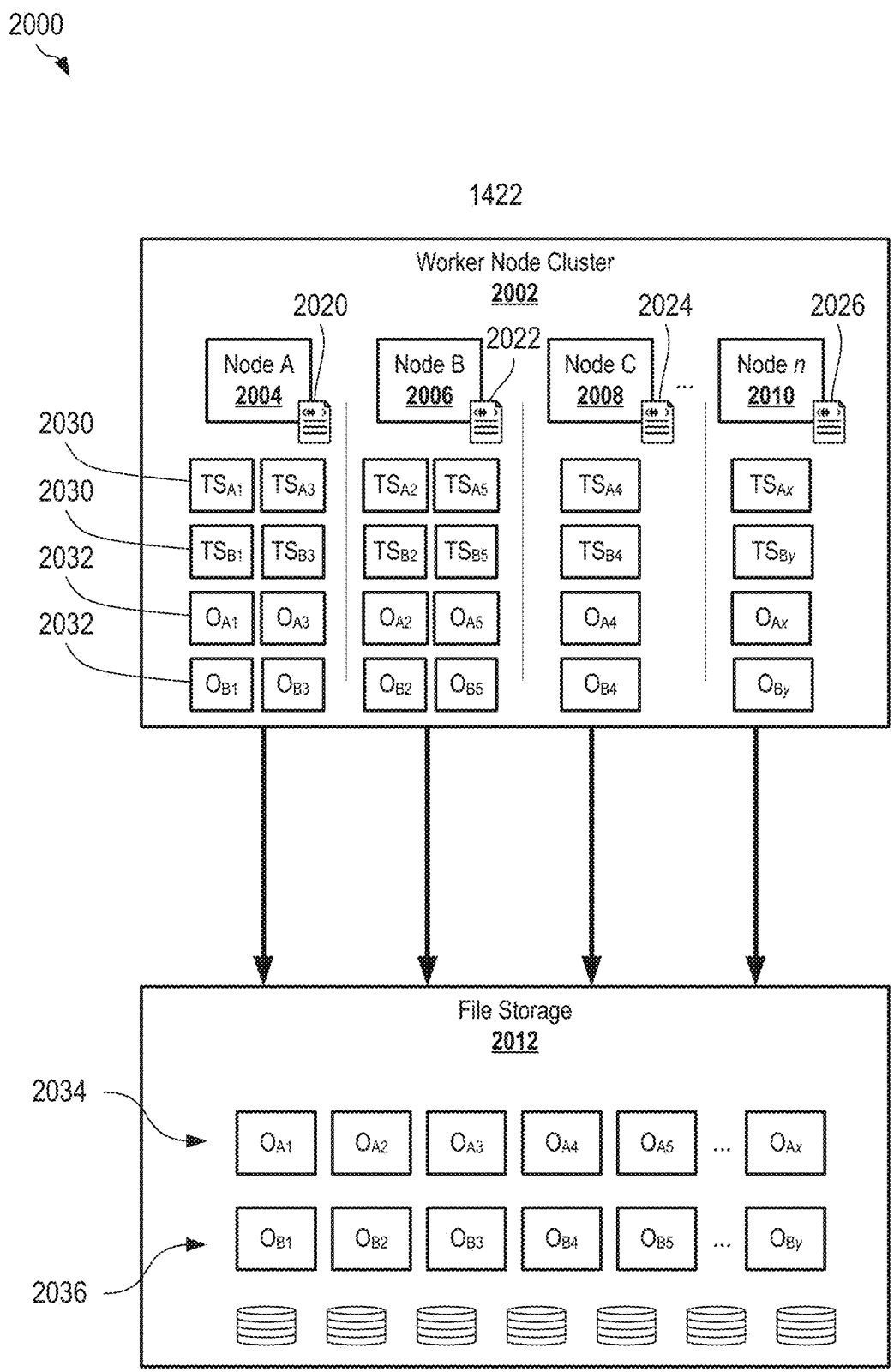
FIG. 20 is a schematic diagram depicting processing of time series and parallel writing of the output data in a computing environment according to certain aspects of the present disclosure.

FIG. 20 is a schematic diagram depicting processing of time series and parallel writing of the output data in a computing environment 2000 according to certain aspects of the present disclosure. The computing environment 2000 can include a worker node cluster 2002 and a file storage 2012. Worker node cluster 2002 and file storage 2012 can be worker node cluster 1402 and file storage 1412 of FIG. 14. The computing environment 2000 can be used to perform process 1300 of FIG. 13. The computing environment 2000 shown in FIG. 20 can be during and/or after processing of the time series and writing of the output data at blocks 1314, 1318 of FIG. 13.

The various time series 2030 stored at each node (e.g., Node A 2004, Node B 2006, and Node C 2008 through Node n 2010) can be processed according to the respective compiled script (e.g., compiled scripts 2020, 2022, 2024, 2026) for that node. Once the time series 2030 is processed according to the compiled script, the result is output data 2032. A separate item and/or file of output data 2032 can be generated for each time series 2030. For example, processing of time series $TS_{A1}$ can result in generation of output data $O_{A1}$.

Each node (e.g., Node A 2004, Node B 2006, and Node C 2008 through Node n 2010) can write its output data 2032 in parallel to a destination, such as a file storage 2012. In some cases, file storage 2012 can be the same file storage from which the input data was obtained. File storage 2012 can be a distributed file system. The output data 2032 can be stored in output data sets 2034, 2036. In some cases, each output data set 2034, 2036 can contains the output data 2032 generated from input data having a commonality, such as originating from the same table (e.g., tables 1414, 1416 of FIG. 14).

Figure 21:
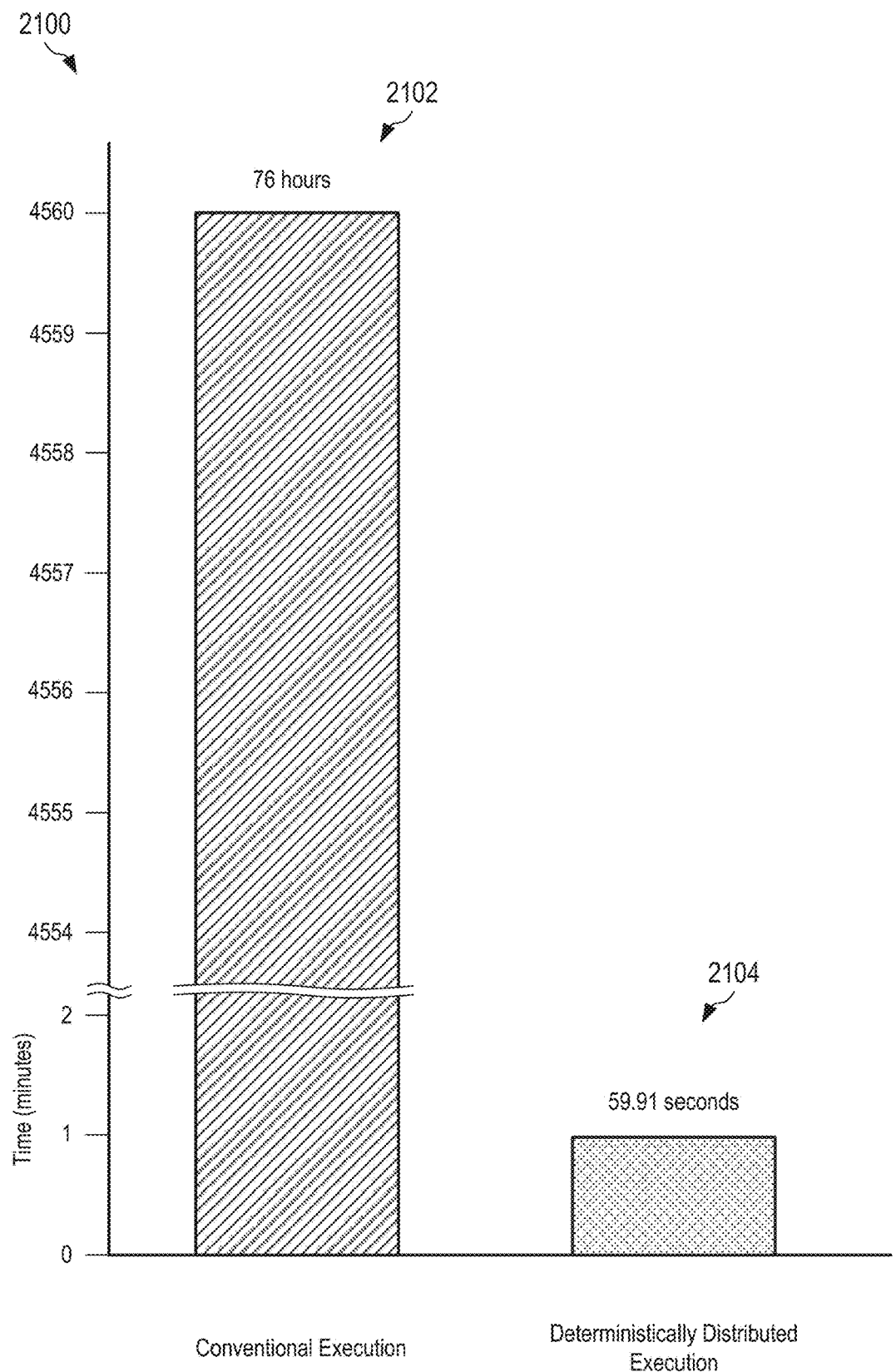
FIG. 21 is a chart depicting processing time for traditional single-processor execution compared to processing time for reading, distributing, and execution using certain aspects of the present disclosure.

FIG. 21 is a y-axis split chart 2100 depicting processing time for conventional execution (e.g., traditional single-processor execution) compared to processing time for deterministically distributed execution (e.g., parallel reading, deterministic distributing, and parallel execution) using certain aspects of the present disclosure. To fit the entire chart 2100 on a single page, the y-axis (representing time in minutes) was split. The input data and analyses performed for both the Conventional Execution results 2102 and the deterministically distributed execution results 2104 were identical.

The input data was a large industrial data set containing 375.11 million observations divided into 1.56 million groups in a hierarchy of store location, product, and customer. The input data file for this input data was approximately 89 GB in size. On average, each group contained 4.3 years of weekly historical data available for analysis.

The deterministically distributed execution results 2104 were obtained according to certain aspects of the present disclosure using 144 worker nodes with 32 threads per node, each node running a 32 core, 2.7 GHz processor with 252 GB of RAM. The total elapsed time to complete all operations was 59.91 seconds, which comprised 49.51 seconds for generating the time series on the nodes (e.g., reading, distributing, and pre-processing the timestamped data), and 10.39 seconds for analyzing the time series according to the compiled script.

By contrast, the conventional execution results 2102 were calculated based on a standard, single-processor computer accessing the same input data and performing the same analyses. The total time estimated to complete the same analyses on the same input data was approximately 76 hours (4560 minutes).

The techniques for deterministically distributed execution disclosed herein are capable of substantial improvements in the processing of large datasets of timestamped data. Further, various aspects of the present disclosure enable very easy scalability with little to no change in the script prepared for processing the timestamped data. If more data is to be processed or a faster result is desired, one can simply add more nodes to the worker node cluster and achieve improved results. Further, the deterministic distribution techniques described herein enable timestamped data to be read a single time from an input data file and automatically partitioned and spread across the nodes, without needing to repeatedly read the individual timestamped entries, thus drastically saving bandwidth and computational expense. Further, even in edge scenarios where the timestamped data is to be partitioned into only a single group, memory savings and improved speed can be achieved by reading the input data set in parallel and pre-processing portions of the time-stamped data before transferring the portions to a single destination node for further processing. These and other aspects of the present disclosure provide numerous benefits, including at least solving memory and bandwidth problems that accompany the processing of very large data sets of timestamped data.

FIG. 22 is a block diagram depicting an example of a node cluster 2200 according to some aspects of the present disclosure. The node cluster 2200 can include any number of nodes (e.g., computing devices). In this example, the node cluster 2200 contains n nodes ranging from node A 2202a through node n 2202n. The node cluster 2200 can read timestamped data 2204, partition the timestamped data 2204 into groups, distribute the groups of timestamped data 2204, and process the timestamped data 2204 (e.g., as discussed in relation to the above figures).

The timestamped data 2204 can be processed at least in part by running a script 2206. As used herein, "running" code (e.g., a script or a code segment) involves interpreting the code with an interpreter, or executing an executable file compiled from the code, depending on the programming language in which the code is written. For example, the node cluster 2200 can distribute the script 2206 to each of the nodes 2202a-n, such that each of the nodes 2202a-n receives a copy of the script 2206. If the script is written in a compiled language (a programming language that is compiled for execution), each of the nodes 2202a-n can compile their copy of the script 2206 into an executable file (e.g., DLL file) and then execute the executable file on its group of timestamped data. For example, node 2202a can run its executable file to process its timestamped data (e.g., $TS_{A1}$, $TS_{A3}$, $TS_{B1}$, and $TS_{B3}$). Node 2202b can likewise run its executable file to process its timestamped data (e.g., $TS_{A2}$, $TS_{A5}$, $TS_{B2}$, and $TS_{B5}$). And so on. Alternatively, the script 2206 can be precompiled into an executable file, and the executable file can then be distributed among the nodes 220a-n, such that each of the nodes 2202a-n receives a copy of the executable file. Either way, the nodes 2202a-n can execute their executable files in series or in parallel to one another. If the script 2206 is written in an interpreted language (a programming language that is interpreted by an interpreter), then each of the nodes 2202a-n can simply use an interpreter to run the script 2206 on its group of timestamped data. For example, node 2202a can run its script with an interpreter to process its timestamped data (e.g., $TS_{A1}$, $TS_{A3}$, $TS_{B1}$, and $TS_{B3}$). Node 2202b can likewise run its script with an interpreter to process its timestamped data (e.g., $TS_{A2}$, $TS_{A5}$, $TS_{B2}$, and $TS_{B5}$). And so on. The nodes 2202a-n can run their scripts in series or in parallel to one another.

One example of the script's content 2208 is shown in the dashed box of FIG. 22. In this example, the script's content 2208 is substantially written in a programming language (e.g., SAS language) and generally includes four sections 2210a-d, though other examples may have any number, combination, and configuration of sections. The first section 2210a and the second section 2210b can set up variables usable by the rest of the script 2206. The third section 2210c can include commands for facilitating execution of a code segment that is in a different programming language (e.g., Python or R) than the rest of the script 2206, as discussed in greater detail below. The fourth section 2210d can be for logging output data associated with the code segment.

As mentioned above, the third section 2210c can facilitate execution of a code segment that is in a different programming language from the rest of the script 2206. The code segment can be user provided, so that users can incorporate their own code segments (e.g., in their preferred programming language) into the system for execution in conjunction with the script. In FIG. 22, the third section 2210c directly includes the code segment. For example, the third section 2210c has the command "py.PushCodeLine" with a string of Python code (e.g., "air*=10"), which serves as the code segment to be run. But other examples can employ additional or alternative methods for causing one or more code segments in other programming languages to be run.

Figure 23:
FIG. 23 is an example of script content according to some aspects.

Another exemplary method for facilitating execution of a code segment is shown in FIG. 23. As shown, the script's content 2302 can include a reference to a file that contains a code segment, where the file is external to the script. For example, the script's content 2302 can be in a first programming language, such as SAS language. And the script's content 2302 can include a reference to a file containing a code segment (e.g., at the path "/path/to/model.r") in a second programming language, such as the R programming language. This portion of the script's content 2302 is shown in bold. Based on the reference to the file, the system may access and run the code segment in the file at runtime.

Figure 24:
FIG. 24 is an example of a table relating one or more keys to code segments according to some aspects.

In some examples, the script's content 2208 can include a reference to an entry in a table located externally to the script. The entry, in turn, can indicate a code segment to run. For instance, FIG. 24 depicts an example of a table 2400 that includes a series of rows. Each row serves as an entry in the table 2400 and includes (i) a pair of keys (a "key pair") that uniquely identifies a group of timestamped data, (ii) an identifier (e.g., name) of a code segment to run in relation to the group of timestamped data, and (iii) a programming language identifier that indicates a programming language of the code segment. For example, the first row in the table 2400 includes the key pair "A1" (which uniquely identifies a particular group of timestamped data) associated with the code segment "MODEL1," which is in the Python2 programming language. But in other examples, the table 2400 can include more, less, or different information than is depicted in FIG. 24. For instance, table 2400 may only include a single key for each entry in another example. And in some examples, the table 2400 may include the code segment itself in each entry, rather than an identifier of the code segment. But regardless of the configuration of the table 2400, the script can reference (e.g., by key or key pair) an entry in the table 2400 for causing execution of the code segment corresponding to the entry.

The script can employ one or more of the above methods to facilitate the running of one or more code segments, which may be in a variety of programming languages that are different from the rest of the script. And while the examples of script content depicted in FIGS. 22-23 include code segments or references thereto that are static, in other examples the script can be configured to generate code segments or references thereto dynamically. For example, the script's content can be configured to dynamically generate a code segment based on a combination of conditional statements (e.g., if-then statements), where the result of each conditional statement yields a code portion, and where the combination of the code portions defines the code segment. This ability to dynamically generate code segments based on various conditions enables different groups of timestamped data to run their own specific code. As another example, the script's reference to a table entry or a file can include a variable value, which may change at runtime depending on the particular group of timestamped data associated with the script. These dynamic approaches can enable different code segments to process at least some of the different groups of timestamped data.

Figure 25:
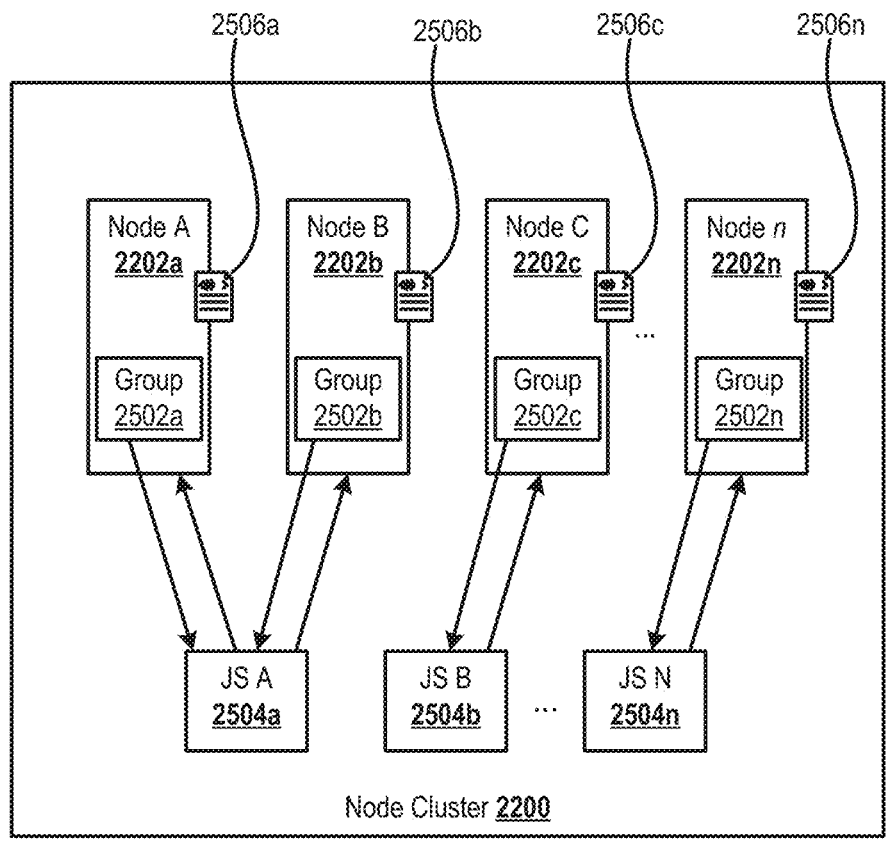
FIG. 25 is a block diagram of an example of nodes interacting with job servers according to some aspects.

To facilitate running of the code segment(s), the nodes can interact with job servers in some examples. One example of such interaction is shown in FIG. 25. In FIG. 25, the node cluster 2200 includes nodes 2202a-n with corresponding executable files 2506a-n compiled from respective copies of the script. The nodes 2202a-n can run the executable files 2506a-n to process the timestamped data within the groups 2502a-n, such that each of the executable files 2506a-n is run on the timestamped data in one of the groups 2502a-n. For example, node 2202a can run its executable file 2506a on its group 2502a of timestamped data. Its group 2502a may include $TS_{A1}$, $TS_{A3}$, $TS_{B1}$, and $TS_{B3}$ from FIG. 22. Similarly, node 2202b can run its executable file 2506b on its group 2502b of timestamped data. Its group 2502b may include $TS_{A2}$, $TS_{A5}$, $TS_{B2}$, and $TS_{B5}$ from FIG. 22. And so on. Similarly, in examples in which the script is in an interpreted language, the nodes 2202a-n can run their copies of the script with an interpreter to process the timestamped data within the groups 2502a-n, such that each copy of the script is run on the timestamped data in one of the groups 2502a-n.

As part of running the executable files 2506a-n (or the script itself in the case of an interpreted language), the nodes 2202a-n may interface with the appropriate job servers 2504a-n for causing the code segments associated therewith to also be run. For example, the job servers 2405a-n can each be compatible with a particular programming language for executing code segments in that particular programming language. As one specific example, job server 2405a can be compatible with the R programming language and include an interpreter for running code segments in the R programming language. Job server 2405b can be compatible with the Python2 programming language and include an interpreter for running code segments in the Python2 programming language. Job server 2405n can be compatible with the C++ programming language and include a compiler for running code segments in the C++ programming language. And so on. The nodes 2202a-n can each select, and interface with, an appropriate one of the job servers 2504a-n based on the programming language of a code segment associated with its executable file 2506a-n.

For example, node 2202a can analyze its copy of the script to determine a code segment to run in conjunction with the script. In one such example, the node 2202a can determine that the script's content includes a reference to a file containing a code segment, obtain the code segment based on the reference, and associate the code segment with the group 2502a. Additionally or alternatively, the node 2202a can determine that the script includes a reference to an entry in a table (e.g., table 2400 of FIG. 24), determine a code segment corresponding to the entry, obtain the code segment, and associate the code segment with the group 2502a. Additionally or alternatively, the node 2202a can determine that the script includes a reference to an entry in a table, but that the entry lacks a group identifier (e.g., a key pair or other identifier of a group of timestamped data). So, the node 2202a can responsively associate a default code segment with the group 2502a. The default code segment may be present in an entry of the table. Regardless of the method, the node 2202a can determine a code segment to run in conjunction with its copy of the script based on the script's content.

After determining the code segment, the node 2202a can determine a programming language corresponding to the code segment and interact with whichever of the job servers 2504a-n is compatible with the code segments programming language. For example, the node 2202a can determine that the code segment is in the R programming language based on information in a table or metadata corresponding to the code segment. So, the node 2202a can select job server 2504a, which is compatible with the R programming language (e.g., because it has the requisite interpreter, libraries, and/or other tools to run instructions in the R programming language). The node 2202a can then interface with the job server 2504a, for example by providing the code segment or an identifier of the code segment to the job server 2504a, to enable the job server 2504a to run the code segment. The node 2202a may also provide input values (e.g., the timestamped data in the group 2502a or a processed version thereof) for the code segment to the job server 2504a. The job server 2504a can respond by running the code segment based on the input values. This may produce output values, such as model values representative of a model (e.g., forecasting model values representative of a forecasting model) associated with the input values. The job server 2504a may return the output values back to the executable file 2506a, which may receive and perform further processing on the output values.

The other nodes 2202b-n can implement similar functionality as node 2202a. For example, node 2202b can determine a code segment associated with group 2502b, determine a programming language of the code segment, determine an appropriate one of the job servers 2504a-n based on the programming language of the code segment (e.g., job server 2504a if the programming language of this code segment is also the R programming language), and interact with that job server for causing the code segment to be run. The job server can run the code segment to produce output values, which the job server may return back to the executable file 2506b. As another example, node 2202c can determine a code segment associated with group 2502c, determine a programming language of the code segment, determine an appropriate one of the job servers 2504a-n based on the programming language of the code segment (e.g., job server 2504b if the programming language of the code segment is Python), and interact with that job server for causing the code segment to be run. The job server can run the code segment to produce output values, which the job server may return back to the executable file 2506c. And so on.

While the job servers 2504a-n are depicted as separate from the nodes 2202a-n in FIG. 25, in other examples the job servers 2504a-n may be located on the nodes 2202a-n. For instance, the nodes 2202a-n may run the executable files 2506a-n (or the script itself in the case of an interpreted language) in a first set of processing threads defining script execution-environments, and may run the job servers 2504a-n in a second set of processing threads defining code segment execution-environments. This may provide at least partial separation between the script execution environments and code segment execution-environments, which can improve security and reliability should a code segment fail or include malicious code. However, the various execution environments can still be configured to exchange data with one another as needed. For instance, the code segment execution-environments can be configured to provide the output values from the code segments back to the script execution-environments for subsequent use by the scripts executing therein.

Figure 26:
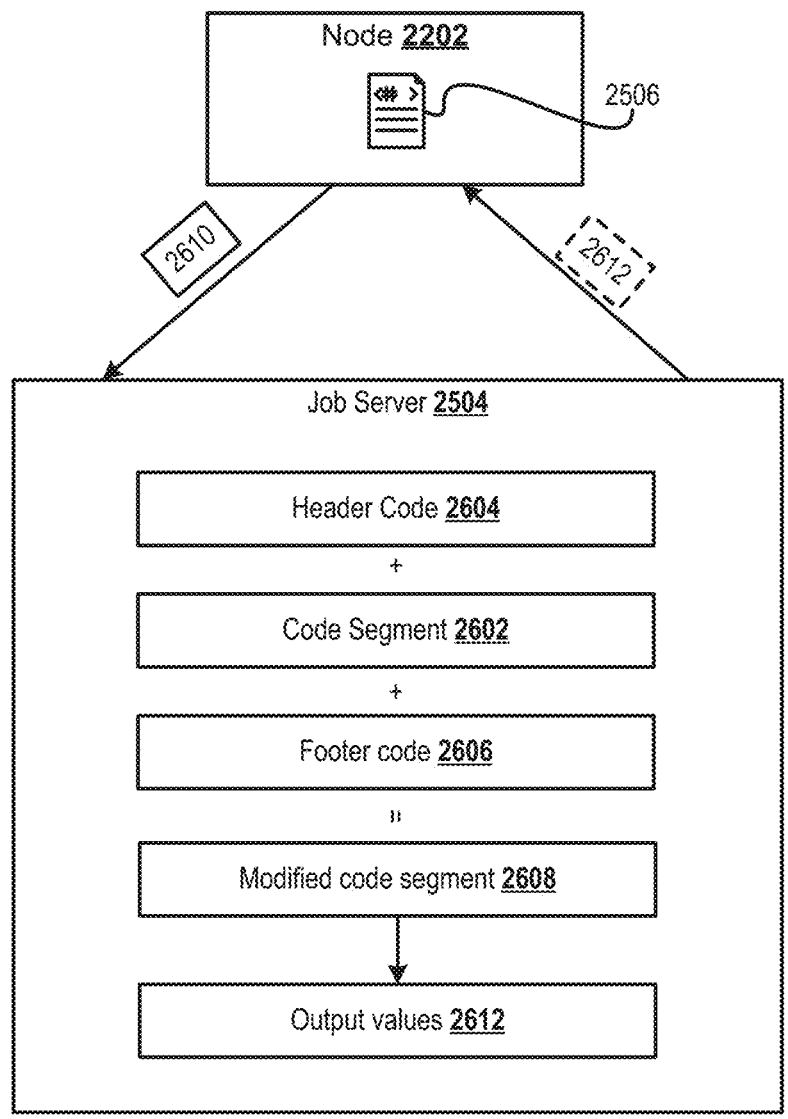
FIG. 26 is a block diagram of an example of a node interacting with a job server according to some aspects.

One example of a node 2202 interacting with a job server 2504 is depicted in FIG. 26. In FIG. 26, the node 2202 is providing a request 2610 associated with a code segment 2602 to the job server 2504, after determining that the job server 2504 is the appropriate job server to which to transmit the request 2610. The request 2610 can include the code segment 2602 or an identifier of the code segment 2602, to enable the job server 2504 to obtain and run the code segment 2602.

The job server 2504 can receive the request and responsively perform one or more operations. For example, the job server 2504 can generate header code 2604 associated with the code segment 2602. The header code 2604 can be in the same programming language as the code segment 2602 (e.g., the R programming language). The header code 2604 can define various objects and functions that facilitate integration between the code segment 2602 and the executable file 2506 (or script) on the node 2202. For example, the header code 2604 can define global variables having values provided in the script, so that the global variables can be consumed by the code segment 2602 at runtime. As another example, the header code 2604 can define an exit handler configured to generate exit codes associated with errors in the code segment 2602. As still another example, the header code 2604 can define a log handler configured to store log data associated with the code segment 2602 (e.g., to enable a developer to perform debugging operations).

Additionally or alternatively, the job server 2504 can generate footer code 2606 associated with the code segment 2602. The footer code 2606 can also be in the same programming language as the code segment 2602. In some examples, the footer code 2606 can define various objects and functions that facilitate integration between the code segment 2602 and the executable file 2506 (or script). For example, the footer code 2606 can define one or more output routines for returning output values 2612 (e.g., model values) back to the executable file 2506 on the node 2202. In one such example, the footer code 2606 can define an output routine that is configured to write the output values 2612 to a data file in a temporary folder associated with the executable file 2506 (or script). This may enable subsequent use of the output values 2612 by the executable file 2506 (or script).

The job server 2504 can combine the header code 2604 and/or the footer code 2606 with the code segment 2602 to generate a modified code segment 2608. For example, the job server 2504 can prepend the header code 2604 to the code segment 2602 and/or append the footer code 2606 to the code segment 2602 to generate the modified code segment 2608.

After generating the modified code segment 2608, the job server 2504 can then run the modified code segment 2608. Running the modified code segment 2608 may involve interpreting the modified code segment 2608 with an interpreter, or compiling and executing the modified code segment 2608, depending on the programming language. Running of the modified code segment 2608 can result in output values 2612, which can be returned back to the node 2202 (e.g., the executable file 2506). The node 2202 may then perform post-processing or other operations based on the output values 2612.

In some examples, the code segment 2602 is configured according to preset rules. The rules can define compatible inputs and outputs to facilitate integration between the code segment 2602 and the script, so that values can be easily passed there-between (e.g., with the aid of the header code 2604 and/or footer code 2606). For example, the rules specify acceptable inputs to the code segment 2602 and acceptable outputs from the code segment 2602, along with proper syntax and other formatting for each of these, that are compatible with the executable file 2506. This may facilitate data exchange between the code segment 2602 and the executable file 2506 at runtime.

The job server 2504 is depicted in FIG. 26 as being separate from the node 2202 for illustrative purposes. Other examples may involve the job server 2504 being located on the node 2202, such as in its own processing thread on the node 2202, or in any of the configurations discussed above.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art. Some examples can be combined with other examples to yield further examples.

The invention claimed is:

1. A system comprising:
   one or more data processors associated with a plurality of computing devices; and
   a non-transitory computer-readable storage medium comprising instructions that are executable by the one or more data processors for causing the plurality of computing devices to:
   read timestamped data and partition the timestamped data into a plurality of groups according to a criterion;
   distribute the timestamped data among the plurality of computing devices based on the plurality of groups;
   obtain copies of a script configured to process the timestamped data, each computing device among the plurality of computing devices receiving a copy of the script, the script comprising instructions for analyzing the timestamped data;

obtain one or more code segments associated with the plurality of groups based on content of the script, the one or more code segments being in one or more programming languages that are different than a programming language of the script, the one or more code segments being referenceable to a string variable, an external file or an external table, and the script including one or more commands for facilitating execution of the one or more code segments in the different programming language; and run the copy of the script in each computing device to process the timestamped data within the plurality of groups, each copy of the script being run on the timestamped data in a respective group among the plurality of groups at least in part by interacting with a job server configured to run a respective code segment associated with the respective group, the respective code segment comprising a reference to the string variable, the external file or the external table, the job server being compatible with a particular programming language of the respective code segment and being configured to:

generate a modified code segment from the respective code segment in the programming language that is different from the script; and run the modified code segment to generate respective model values associated with the respective group.

2. The system of claim 1, wherein the content of the script includes references to:

an identifier of a code segment to run with the job server in relation to the group of timestamped data; and a programming language identifier that indicates the programming language of the code segment to run with the job server.

3. The system of claim 1, wherein the content of the script includes references to one or more external tables for logging output data associated with the one or more code segments.

4. The system of claim 1, wherein the content of the script is configured to dynamically generate the one or more code segments from a combination of one or more conditional statements, wherein the one or more conditional statements yields one or more code portions from the string variable, from the external file, or from the external table, and wherein a combination of the one or more code portions defines the one or more code segments.

5. The system of claim 1, wherein the non-transitory computer-readable storage medium further comprises instructions that are executable by the one or more data processors for causing the plurality of computing devices to:

determine that the script includes one or more references to one or more files containing the one or more code segments, the one or more files being external to the script; or determine that the script includes a reference to at least one table entry in a table that is external to the script;

determine that the reference to the at least one file or the at least one table entry includes a variable value that is changeable based on the timestamped data in the respective group; and determine the one or more code segments associated with the timestamped data in the respective group based on the variable value.

6. The system of claim 1, wherein the non-transitory computer-readable storage medium further comprises instructions that are executable by the one or more data processors for causing the plurality of computing devices to:

compile at least one of the copies of the script into an executable file;

select the job server from a plurality of job servers based on the job server being compatible with the particular programming language to run the one or more code segments to produce output values;

run the executable file on the timestamped data within the respective group among the plurality of groups to produce the output values; and return the produced output values to the executable file.

7. The system of claim 1, wherein each copy of the script is precompiled into an executable file prior to each computing device among the plurality of computing devices receiving the copy of the script.

8. The system of claim 1, wherein the job server is compatible with an interpretative programming language, and wherein the job server includes an interpreter for running the respective code segment with the interpretative programming language.

9. The system of claim 1, wherein the job server is compatible with a compiled programming language, and wherein the job server includes a compiler for running the respective code segment with the compiled programming language.

10. The system of claim 1, wherein the job server is configured to:

receive a request from each computing device among the plurality of computing devices associated with the one or more code segments;

generate header code and footer code associated with the one or more code segments, the modified code segment incorporating the generated header code and the generated footer code, the header code or the footer code facilitating integration between the one or more code segments and the script; and transmit to the requesting computing device the generated respective model values associated with the respective group.

11. The system of claim 1, wherein running the copy of the script in each computing device to process the timestamped data within the plurality of groups comprises:

running a first copy of the script in a first computing device with a first operating system; and running a second copy of the script in second computing device with a second operation system, the second operating system being different than the first operating system.

12. A computer-implemented method comprising:

reading timestamped data and partitioning the timestamped data into a plurality of groups according to a criterion;

distributing the timestamped data among a plurality of computing devices based on the plurality of groups;

obtaining copies of a script configured to process the timestamped data, each computing device among the plurality of computing devices receiving a copy of the script, the script comprising instructions for analyzing the timestamped data;

obtaining one or more code segments associated with the plurality of groups based on content of the script, the one or more code segments being in one or more programming languages that are different than a programming language of the script, the one or more code segments being referenceable to a string variable, an external file or an external table, and the script including one or more commands for facilitating execution of the one or more code segments in the different programming language; and running the copy of the script in each computing device to process the timestamped data within the plurality of groups, each copy of the script being run on the timestamped data in a respective group among the plurality of groups at least in part by interacting with a job server configured to run a respective code segment associated with the respective group, the respective code segment comprising a reference to the string variable, the external file or the external table, the job server being compatible with a particular programming language of the respective code segment and being configured to:

generating a modified code segment from the respective code segment in the programming language that is different from the script; and running the modified code segment to generate respective model values associated with the respective group.

13. The computer-implemented method of claim 12, wherein the content of the script includes references to:
an identifier of a code segment to run with the job server in relation to the group of timestamped data; and
a programming language identifier that indicates the programming language of the code segment to run with the job server.

14. The computer-implemented method of claim 12, wherein the content of the script includes references to one or more external tables for logging output data associated with the one or more code segments.

15. The computer-implemented method of claim 12, wherein the content of the script is configured to dynamically generate the one or more code segments from a combination of one or more conditional statements,
wherein the one or more conditional statements yields one or more code portions from the string variable, from the external file, or from the external table, and
wherein a combination of the one or more code portions defines the one or more code segments.

16. The computer-implemented method of claim 12, further comprising:
determining that the script includes one or more references to one or more files containing the one or more code segments, the one or more files being external to the script; or
determining that the script includes a reference to at least one table entry in a table that is external to the script;
determining that the reference to the at least one file or the at least one table entry includes a variable value that is changeable based on the timestamped data in the respective group; and
determining the one or more code segments associated with the timestamped data in the respective group based on the variable value.

17. The computer-implemented method of claim 12, further comprising:
compiling at least one of the copies of the script into an executable file;
selecting the job server from a plurality of job servers based on the job server being compatible with the particular programming language to run the one or more code segments to produce output values;
running the executable file on the timestamped data within the respective group among the plurality of groups to produce the output values; and
returning the produced output values to the executable file.

18. The computer-implemented method of claim 12, wherein each copy of the script is precompiled into an executable file prior to each computing device among the plurality of computing devices receiving the copy of the script.

19. The computer-implemented method of claim 12, wherein the job server is compatible with an interpretative programming language, and
wherein the job server includes an interpreter for running the respective code segment with the interpretative programming language.

20. The computer-implemented method of claim 12, wherein the job server is compatible with a compiled programming language, and
wherein the job server includes a compiler for running the respective code segment with the compiled programming language.

21. The computer-implemented method of claim 12, wherein the job server is configured to:
receive a request from each computing device among the plurality of computing devices associated with the one or more code segments;
generate header code and footer code associated with the one or more code segments, the modified code segment incorporating the generated header code and the generated footer code, the header code or the footer code facilitating integration between the one or more code segments and the script; and
transmit to the requesting computing device the generated respective model values associated with the respective group.

22. A non-transitory computer-readable medium comprising program code that is executable by one or more data processors associated with a plurality of computing devices for causing the plurality of computing devices to:
read timestamped data and partition the timestamped data into a plurality of groups according to a criterion;
distribute the timestamped data among the plurality of computing devices based on the plurality of groups;
obtain copies of a script configured to process the timestamped data, each computing device among the plurality of computing devices receiving a copy of the script, the script comprising instructions for analyzing the timestamped data;
obtain one or more code segments associated with the plurality of groups based on content of the script, the one or more code segments being in one or more programming languages that are different than a programming language of the script, the one or more code segments being referenceable to a string variable, an external file or an external table, and the script including one or more commands for facilitating execution of the one or more code segments in the different programming language; and
run the copy of the script in each computing device to process the timestamped data within the plurality of groups, each copy of the script being run on the timestamped data in a respective group among the plurality of groups at least in part by interacting with a job server configured to run a respective code segment associated with the respective group, the respective code segment comprising a reference to the string variable, the external file or the external table, the job server being compatible with a particular programming language of the respective code segment and being configured to:
- generate a modified code segment from the respective code segment in the programming language that is different from the script; and
- run the modified code segment to generate respective model values associated with the respective group.

23. The non-transitory computer-readable medium of claim 22, wherein the content of the script includes references to:
- an identifier of a code segment to run with the job server in relation to the group of timestamped data; and
- a programming language identifier that indicates the programming language of the code segment to run with the job server.

24. The non-transitory computer-readable medium of claim 22, wherein the content of the script includes references to one or more external tables for logging output data associated with the one or more code segments.

25. The non-transitory computer-readable medium of claim 22, wherein the content of the script is configured to dynamically generate the one or more code segments from a combination of one or more conditional statements,
- wherein the one or more conditional statements yields one or more code portions from the string variable, from the external file, or from the external table, and
- wherein a combination of the one or more code portions defines the one or more code segments.

26. The non-transitory computer-readable medium of claim 22, further comprising program code that is executable by the one or more data processors for causing the plurality of computing devices to:
- determine that the script includes one or more references to one or more files containing the one or more code segments, the one or more files being external to the script; or
- determine that the script includes a reference to at least one table entry in a table that is external to the script;
- determine that the reference to the at least one file or the at least one table entry includes a variable value that is changeable based on the timestamped data in the respective group; and
- determine the one or more code segments associated with the timestamped data in the respective group based on the variable value.

27. The non-transitory computer-readable medium of claim 22, further comprising program code that is executable by the one or more data processors for causing the plurality of computing devices to:
- compile at least one of the copies of the script into an executable file;
- select the job server from a plurality of job servers based on the job server being compatible with the particular programming language to run the one or more code segments to produce output values;
- run the executable file on the timestamped data within the respective group among the plurality of groups to produce the output values; and
- return the produced output values to the executable file.

28. The non-transitory computer-readable medium of claim 22, wherein each copy of the script is precompiled into an executable file prior to each computing device among the plurality of computing devices receiving the copy of the script.

29. The non-transitory computer-readable medium of claim 22, wherein the job server is compatible with an interpretative programming language, and
- wherein the job server includes an interpreter for running the respective code segment with the interpretative programming language.

30. The non-transitory computer-readable medium of claim 22, wherein the job server is compatible with a compiled programming language, and
- wherein the job server includes a compiler for running the respective code segment with the compiled programming language.

* * * * *